(12) United States Patent
Takamura et al.

(10) Patent No.: US 7,983,338 B2
(45) Date of Patent: Jul. 19, 2011

(54) METHOD FOR PROGRESSIVE LOSSLESS VIDEO CODING, METHOD FOR PROGRESSIVE LOSSLESS VIDEO DECODING, PROGRESSIVE LOSSLESS VIDEO CODING APPARATUS, PROGRESSIVE LOSSLESS VIDEO DECODING APPARATUS, PROGRESSIVE LOSSLESS VIDEO CODING PROGRAM, PROGRESSIVE LOSSLESS VIDEO DECODING PROGRAM, AND RECORDING MEDIA OF PROGRESSIVE LOSSLESS VIDEO CODING PROGRAM AND PROGRESSIVE LOSSLESS VIDEO DECODING PROGRAM

(75) Inventors: Seishi Takamura, Yokohama (JP); Yoshiyuki Yashima, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1098 days.

(21) Appl. No.: 10/589,520

(22) PCT Filed: Sep. 29, 2005

(86) PCT No.: PCT/JP2005/018015
§ 371 (c)(1),
(2), (4) Date: May 16, 2007

(87) PCT Pub. No.: WO2006/035899
PCT Pub. Date: Apr. 6, 2006

(65) Prior Publication Data
US 2007/0280351 A1      Dec. 6, 2007

(30) Foreign Application Priority Data
Sep. 30, 2004   (JP) ............................... P 2004-286412

(51) Int. Cl.
*H04N 11/02*           (2006.01)

(52) U.S. Cl. .............................. 375/240.12; 375/240.11
(58) Field of Classification Search .................... None
See application file for complete search history.

(56) References Cited

U.S. PATENT DOCUMENTS
6,141,445 A * 10/2000 Castelli et al. ................ 382/232
(Continued)

FOREIGN PATENT DOCUMENTS
CN           1549988 A      11/2004
(Continued)

OTHER PUBLICATIONS
ISO/IEC 15444-3; 2002 Information technology—JPEG 2000 image coding system—Part 3; Motion JPEG 2000.
(Continued)

*Primary Examiner* — Marsha D Banks Harold
*Assistant Examiner* — Christopher Findley
(74) *Attorney, Agent, or Firm* — Harness, Dickey & Pierce, P.L.C.

(57) ABSTRACT

Highly efficient lossless decoding is realized under the condition that codes transmitted as a base part are compatible with the H.264 standard. An orthogonal transformation section (12) performs orthogonal transformation of residual signals (Rorig), acquires transform coefficients (Xorig), and a quantization section (13) quantizes the transform coefficients. An existential space determination section (14) obtains information on upper limits and lower limits of the respective coefficients (an existential space of transform coefficients) from quantization information. A bundled coefficients coding section (16) decides whether respective grid points in the existential space of the transform coefficients have validity as results of orthogonal transformation of the residual signals, and enumerates valid grid points, assigns serial numbers (index) in the order of enumeration, and encodes using a serial number coding section (166) the serial numbers of grid points which match the transform coefficients (Xorig) of the residual signal.

11 Claims, 6 Drawing Sheets

U.S. PATENT DOCUMENTS

| | | | |
|---|---|---|---|
| 6,263,022 B1* | 7/2001 | Chen et al. | 375/240.03 |
| 6,363,119 B1* | 3/2002 | Oami | 375/240.03 |
| 7,372,904 B2* | 5/2008 | Jiang et al. | 375/240.02 |
| 7,617,097 B2* | 11/2009 | Kim et al. | 704/219 |
| 2002/0126759 A1* | 9/2002 | Peng et al. | 375/240.16 |
| 2003/0021485 A1 | 1/2003 | Raveendran et al. | |

FOREIGN PATENT DOCUMENTS

| | | |
|---|---|---|
| EP | 1402464 A2 | 3/2004 |
| JP | 63-253784 A | 10/1988 |
| JP | 08-251418 A | 9/1996 |
| JP | 2001-359099 A | 12/2001 |
| JP | 2005-520360 A | 7/2005 |
| KR | 2004-018414 A | 3/2004 |
| WO | WO-03/005626 A2 | 1/2003 |

OTHER PUBLICATIONS

ISO/IEC 14495-1; 1999 Information technology—Lossless and near-lossless compression of continuous-tone still images: Baseline.

ISO/IEC 14496-10; 2003 Information technology—Coding of audio-visual objects—Part 10; Advanced Video Coding.

Nakajima, Yashima, Kobayashi: "A Study on Hierarchical Lossless Video Coding using MPEG-2 Parameters," The Institute of Electronics, Information, and Communication Engineers General Conference, D-11-49, Mar. 2000.

ISO/IEC 14496-2: 2003 Information technology—Coding of audio-visual objects—Part 2: Visual.

http://bs.hhi.de/~suehring/tml/, "JM Reference Software Version 8.4", Jul. 2004.

Y. Itoh, N-M Cheung: "Universal variable length code for DCT coding," IEEE Proc. Intl. Conf. Image Processing, vol. 1, pp. 940-943, 2000.

Manohar, M., et al., "Progressive Vector Quantization of Multispectral Image Data Using a Massively Parallel SIMD Machine," Data Compression Conference, IEEE Comput. Soc., Mar. 24, 1992, pp. 181-190.

Clauss, Philippe, et al., "Parametric Analysis of Polyhedral Iteration Spaces," International Conference on Application-Specific Systems, Architectures and Processors, Proceedings, IEEE, 1996, pp. 415-424.

Memon, Nasir D., et al., "Simple Method for Enhancing the Performance of Lossy Plus Lossless Image Compression Schemes," Journal of Electronic Imaging, SPIE, vol. 2, No. 3, Jul. 1993, pp. 245-252.

Takamura, Seishi, et al., "Lossless Scalable Video Coding with H.264 Compliant Base Layer," Image Processing, 2005, IEEE International Conference in Genova, Italy, vol. 2, Sep. 11, 2005, pp. 754-757.

Takamura, Seishi, et al., "Proposal of SNR Scalability Method with up to Lossless Enhancement," 70th MPEG Meeting, International Organisation for Standardisation, Coding of Moving Pictures and Audio, ITU Study Group 16—Video Coding Experts Group, ISO/IEC JTC1/SC29/WG11, MPEG/M11234, Oct. 14, 2004.

* cited by examiner

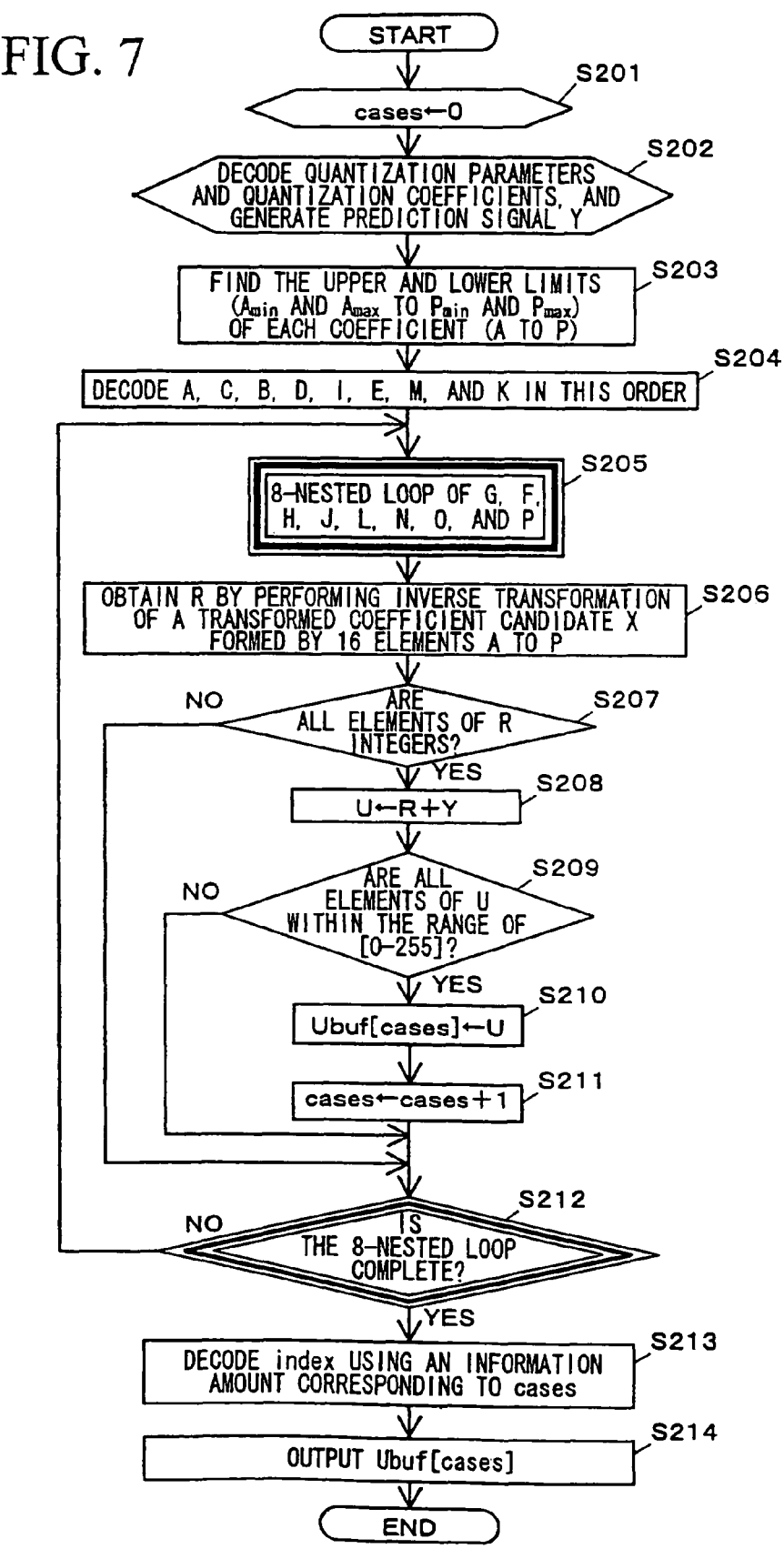

METHOD FOR PROGRESSIVE LOSSLESS VIDEO CODING, METHOD FOR PROGRESSIVE LOSSLESS VIDEO DECODING, PROGRESSIVE LOSSLESS VIDEO CODING APPARATUS, PROGRESSIVE LOSSLESS VIDEO DECODING APPARATUS, PROGRESSIVE LOSSLESS VIDEO CODING PROGRAM, PROGRESSIVE LOSSLESS VIDEO DECODING PROGRAM, AND RECORDING MEDIA OF PROGRESSIVE LOSSLESS VIDEO CODING PROGRAM AND PROGRESSIVE LOSSLESS VIDEO DECODING PROGRAM

TECHNICAL FIELD

The present invention relates to highly efficient video coding/decoding technology. More specifically, it relates to progressive lossless video coding/decoding technology that enables lossless decoding matching the original signal, while maintaining compatibility of code transmitted as the base part with the H.264 standard and restricting the coding amount of the additional part to a minimum.

Priority is claimed on Japanese Patent Application No. 2004-286412, filed on Sep. 30, 2004, the content of which is incorporated herein by reference.

BACKGROUND ART

Conventional lossless or progressive video coding schemes include the schemes mentioned below. The lossless mode of Motion JPEG 2000 standard (see non-patent reference 1) and JPEG-LS (see non-patent reference 2) perform closed intra-frame coding since they are based on still images.

The "Fidelity Range Extension (FRExt)," the second version of the H.264 standard (see non-patent reference 3) transmits the intra-frame and the inter-frame prediction residual signals as-is (without orthogonal transformation and quantization).

Progressive coding schemes combined with lossy coding schemes include schemes that code differences between decoded images and original images (refer to non-patent reference 4). Such schemes use MPEG-2 in the basic information, which can be used even by other schemes.

Moreover, there are schemes that apply Discrete Cosine Transforms (DCT) for transformation of coefficients to integers, expand and successively transmit the transformed integers to bit planes, as in the Fine Granularity Scalable (FGS) Profile scheme in the MPEG-4 standard (see non-patent reference 5).

[Non-Patent Reference 1]
ISO/IEC 15444-3: 2002 Information technology—JPEG 2000 image coding system—Part 3: Motion JPEG 2000

[Non-Patent Reference 2]
ISO/IEC 14495-1: 1999 Information technology—Lossless and near-lossless coding of continuous tone still images

[Non-Patent Reference 3]
ISO/IEC 14496-10: 2003 Information technology—Coding of audio-visual objects—Part 10: Advanced Video Coding

[Non-Patent Reference 4]
Nakajima, Yashima, Kobayashi: "Study on hierarchical lossless coding based on MPEG-2 coding parameters," The Institute of Electronics, Information, and Communication Engineers General Conference, D-11-49, March 2000.

[Non-Patent Reference 5]
ISO/IEC 14496-2: 2003 Information technology—Coding of audio-visual objects—Part 2: Visual

DISCLOSURE OF INVENTION

Problem to be Solved by the Invention

The JPEG2000 (see non-patent reference 1) above can transmit progressively but it cannot perform highly efficient coding using video-specific inter-frame correlation because it performs intra-frame coding. Also, the above-mentioned JPEG-LS (see non-patent reference 2) has a higher efficiency compared to JPEG2000, but it is limited in its efficiency since it performs closed intra-frame coding, and it cannot transmit progressively.

"Fidelity Range Extension (FRExt)," the second version of the H.264 standard (non-patent reference 3) has the problem that it cannot transmit progressively.

The technology mentioned in the non-patent reference 4 is meant for coding the residual in the original signal space and not for coding the residual in the orthogonal transformation space. Therefore, it has limitations in compression efficiency since coding has to be performed considering even the spaces in which the primarily original signals do not exist.

The Fine Granularity Scalable (FGS) Profile scheme of MPEG-4 standard (see non-patent reference 5) had the problems mentioned below.

After DCT, which is real number transformation, the coefficients are transformed to integers; therefore, lossless coding is not possible regardless of the amount of additional information used;

If it is used as-is in H.264 standard schemes in which the coefficients after transformation are expanded as in equation (6) described later, the expanded part is added as-is to the wasted coding amount.

In this way, the scheme in which video-coding efficiency was enhanced by performing inter-frame predictions, scalability existed, and basic information was compatible with the H.264 standard, had not been proposed.

In the light of the problems mentioned above, the present invention has as its object, to enable lossless decoding while restricting the coding amount of the additional part to a minimum and maintaining compatibility with the H.264 standard of the code transmitted as the base part.

Means for Solving the Problems

To resolve the problems mentioned above, the progressive lossless video coding method according to the first aspect of the present invention is a progressive lossless video coding method that performs video coding which allows decoding that matches an original signal comprising: a step that inputs a residual signal obtained by subtracting a prediction signal from an original signal for each block of an image signal, the prediction signal conforming to a predetermined lossy video coding scheme and being obtained by space prediction in intra-frame coding or by time prediction in inter-frame coding; a step that determines transform coefficients obtained by applying orthogonal transformation on the residual signal and quantization coefficients obtained by quantizing the transform coefficients based on the lossy video coding scheme; a step that identifies existential space of transformed coefficients established from the quantization coefficients, and quantization parameters and quantization methods used during quantization; a validity judging step that judges whether grid points in the existential space of the transform coefficients are valid as a result of orthogonal transformation of the residual signal; an enumerating step that searches, in a predetermined grid point order, grid points for which the judgment is valid from the grid points in the existential space of the transform coefficients, and enumerates the grid points thus searched; a step that assigns serial numbers in the order of enumeration to enumerated grid points; a step that acquires serial numbers of grid points matching the transform coefficients of the residual signal from the enumerated grid points, and a step that codes and outputs the serial numbers of the grid points matching the transform coefficients of the residual signal.

According to the second aspect of the present invention, in the progressive lossless video coding method, in the enumerating step that enumerates the grid points for which the judgment is valid from the grid points in the existential space of the transform coefficients, processing of judgment on whether the grid points are valid as the result of the orthogonal transformation of the residual signal is omitted for grid points at which transform coefficients cannot take in the space by using an integer value relationship between the transform coefficients.

According to the third aspect of the present invention, the progressive lossless video coding method further comprises a step that outputs information excluding values for which some specific transform coefficients cannot take by using an integer value relationship between the specific transform coefficients and coefficients which have been already output, instead of outputting the specific transform coefficients, wherein, in the enumerating step that enumerates grid points for which the judgment is valid from the grid points in the existential space of the transform coefficients, the grid points are enumerated in existential space having a reduced dimension using the transform coefficients output beforehand.

According to the fourth aspect of the present invention, in the progressive lossless video coding method, the validity judging step judges validity using only bit operations, integer addition, and integer subtraction.

According to the fifth aspect of the present invention, in the progressive lossless video coding method, by using the knowledge that an intersection between an existential range of the residual signal and an existential range of the transform coefficients becomes a convex polyhedron, the validity judgment is suspended halfway when the grid points to be judged exist outside the convex polyhedron.

According to the sixth aspect of the present invention, the progressive lossless video coding method further comprises a step that estimates a coding amount without executing the enumerating step that enumerates the grid points for which the judgment is valid from the grid points in the existential space of the transform coefficients.

The seventh aspect of the present invention is a decoding method for decoding coded streams coded by the progressive lossless video coding method, comprises: a step that executes a decoding scheme corresponding to the predetermined lossy video coding scheme; a step that identifies existential space of transform coefficients established from quantization parameters, quantization coefficients, quantization methods on a coding side, and, if any, already decoded coefficients; a step that decodes coefficients that need to be decoded; a validity judging step that judges whether a grid point in the existential space of the transform coefficients is valid as a result of orthogonal transformation of the residual signal; an enumerating step that searches grid points from the grid points in the existential space of the transform coefficients for which the judgment is valid in the same order as the order of search of the grid points during coding; a step that decodes serial numbers; and a step that outputs grid points having orders that are equal to the decoded serial numbers from enumerated grid points.

A progressive lossless video coding apparatus according to the eighth aspect of the present invention is a lossless video coding apparatus that performs video coding which allows decoding that matches an original signal, comprising: a means that inputs a residual signal obtained by subtracting a prediction signal from an original signal for each block of an image signal, the prediction signal conforming to a predetermined lossy video coding scheme and being obtained by space prediction in intra-frame coding or by time prediction in inter-frame coding; a means that determines transform coefficients obtained by applying orthogonal transformation on the residual signal and quantization coefficients obtained by quantizing the transform coefficients based on the lossy video coding scheme; an existential space deciding means that identifies existential space of transformed coefficients established from the quantization coefficients, and quantization parameters and quantization methods used during quantization; a validity judging means that judges whether grid points in the existential space of the transform coefficients are valid as a result of the orthogonal transformation of the residual signal; an enumerating means that searches, in a predetermined grid point order, grid points for which the judgment is valid from the grid points in the existential space of the transform coefficients, and enumerates the grid points thus searched; a means that assigns serial numbers in the order of enumeration to enumerated grid points; a means that acquires serial numbers of grid points matching the transform coefficients of the residual signal from enumerated grid points, and a means that codes and outputs the serial numbers of the grid points matching the transform coefficients of the residual signal.

The ninth aspect of the present invention is a lossless video decoding apparatus that decodes coded streams coded by the progressive lossless video coding apparatus, comprising: a means that executes a decoding scheme corresponding to the predetermined lossy video coding scheme; an existential space determining means that identifies existential space of transform coefficients established from quantization parameters, quantization coefficients, quantization methods on a coding side, and, if any, already decoded coefficients; a coefficient decoding means that decodes coefficients that need to be decoded; a validity judging means that judges whether a grid point in the existential space of the transform coefficients is valid as a result of orthogonal transformation of the residual signal; an enumerating means that searches grid points from the grid points in the existential space of the transform coefficients for which the judgment is valid in the same order as the order of search of grid points during coding; a serial number decoding means that decodes serial numbers; and an output means that outputs grid points having orders that are equal to the decoded serial numbers from enumerated grid points.

The progressive lossless video coding and decoding processes mentioned above can be realized by computer and software programs. These programs can be recorded and offered in recording media readable by computers, and they can also be offered through a network.

That is, the tenth aspect of the present invention is a progressive lossless video coding program for executing the progressive lossless video coding method of the present invention on the computer.

The eleventh aspect of the present invention is a progressive lossless video decoding program for executing the progressive lossless video decoding method of the present invention on the computer.

The twelfth aspect of the present invention is a recording medium for a progressive lossless video coding program wherein a program for executing on a computer the progressive lossless video coding method of the present invention is recorded on a recording medium that can be read by the computer.

The thirteenth aspect of the present invention is a recording medium for a progressive lossless video decoding program wherein a program for executing on a computer the progressive lossless video decoding method of the present invention is recorded on a recording medium that can be read by the computer.

Effect of the Invention

According to the present invention, lossless decoding that matches the original signals can be performed while maintaining compatibility with the coding in the H.264 standard for codes transmitted as base part, and restricting the coding amount of the additional part to a minimum.

Moreover, according to the present invention, the above processing can be speeded up by several trillions of times. Furthermore, the coding amount can be estimated without actually performing coding. As a result, the selection of prediction mode for reducing the coding amount can be speeded up.

BRIEF DESCRIPTION OF THE DRAWINGS

FIG. 7 shows the process flow of Example 2.

EXPLANATION OF REFERENCE NUMERALS

Figure 1:
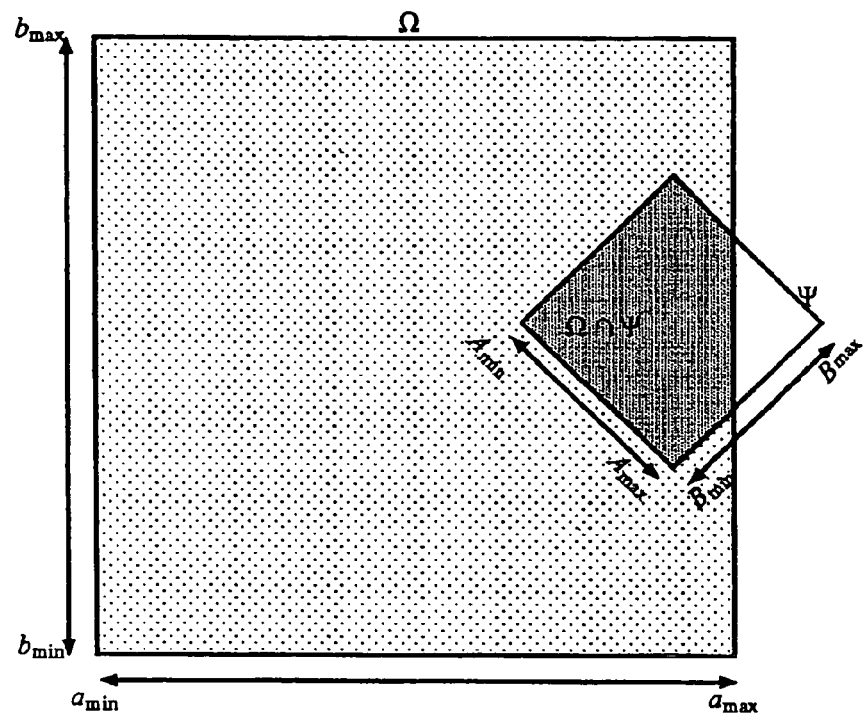
FIG. 1 shows the existential range $\Omega$ and $\Psi$ of R and X respectively.

1 Progressive lossless video coding apparatus
2, 3 Progressive lossless video decoding apparatus
11 Initialization section
12 Orthogonal transformation section
13 Quantization section
14 Existential space determination section
15 Successive coefficients coding section
16 Bundled coefficients coding section
17 End judging section
21 Initialization decoding section
22 Existential space determination section
23 Successive coefficients decoding section
24, 28 Bundled coefficients decoding section
25 Ubuf [ ]
26 End judging section
27 Universal variable length decoding section
161, 241, 281 Multiple loop starting section
162, 242, 282 Inverse orthogonal transformation section
163, 243, 283 Prediction signal adding section
164, 244, 284 Internal variable updating section
165, 245, 285 Multiple loop end judging section
166 Serial number coding section
246 Serial number decoding section
247, 286 Original signal output section

BEST MODE FOR CARRYING OUT THE INVENTION

Embodiments and the Examples for carrying out the present invention are described here referring to the drawings. Note, however, that the present invention is not limited to the Embodiments and the Examples described hereunder; for instance, a suitable combination of these may also be included in the scope of the present invention.

The orthogonal transformation of the H.264 scheme is described hereunder, on the premise of the explanation of the present invention.

Orthogonal Transformation of the H.264 Scheme

In the H.264 standard, after predicting the pixel values within the frame or between frames, orthogonal transformation of the residual and quantization of coefficients are performed for every small block of 4 vertical and horizontal pixels.

The small block of original signals is expressed as a 4×4 matrix U, and the signals predicting the block in the frame or between frames are similar expressed by a 4×4 matrix Y. Thus, the prediction residual signal (4×4 matrix R) is taken as:

$$R = U - Y \qquad (1)$$

All elements of these matrices are integers. Here, each element of the residual signal is expressed as below.

$$R = \begin{bmatrix} a & b & c & d \\ e & f & g & h \\ i & j & k & l \\ m & n & o & p \end{bmatrix} \qquad (2)$$

Orthogonal transformation is applied to this matrix as below.

$$X = TRT^t \qquad (3)$$

Where, $$T = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \qquad (4)$$

$T^t$ expresses the transpose of the matrix T.

Moreover, each element of X is as below.

$$X = \begin{bmatrix} A & B & C & D \\ E & F & G & H \\ I & J & K & L \\ M & N & O & P \end{bmatrix} \qquad (5)$$

Note that although T is an orthogonal transformation, it is not an orthonormal transformation. The determinant of orthonormal transformation is always 1, but the determinant of T (detT) is 40. Thus, the volume of an arbitrary 16-dimensional area becomes 40 times after mapping by T. In equation (3), transformation is applied by T to 4 rows and 4 columns of R. Thus, the coefficient X after transformation is extended and mapped to an extremely sparse space compared to the state before the transformation (residual signal R), as below.

$$40^{4+4}=6,553,600,000,000 \text{ times} \qquad (6)$$

The orthogonal transform coefficient in the H.264 is an integer, but most of the grid points of the coefficient space are unsuitable as residual signals (that is, integral values are not obtained even after inverse transformation by equation (8) given later). Assuming that all grid points of the coefficient space are to be used, and the grid points corresponding to the original signals are coded, excess bits calculated by dividing the logarithm of the number to the base 2 by the number of pixels (4*4=16) will be needed per pixel.

$$\log_2(40^{4+4})/16=2.66[\text{bit}] \qquad (7)$$

Considering that the target signal is 8 bits (per color component), the increase of 2.66 bits must hinder the practical use noticeably.

In the H.264 scheme, each element of X that has been expanded considerably as mentioned above is roughly (in a comparatively large width) quantized, and the expanded part is compensated.

If no quantization is performed, the residual signals are completely restored by the following inverse transformation $$R=T^{-1}X(T^t)^{-1} \qquad (8)$$

The 4×4 matrix U of original pixel values can be restored by the following equation.

$$U=R+Y \qquad (9)$$

However, in practice, when the quantized coefficients in the H.264 coding are subjected to inverse quantization on the decoding side, values close to the original values, but not exactly the same as the original values are reproduced. In this way, after the transmission of X, a different value X' (not equal to X) is obtained, and when it is subjected to inverse transformation by equation (8), becomes:

$$R \ne R'=T^{-1}X'(T^t)^{-1}$$

On the decoding side, Y can have the same value as on the coding side, but since R cannot be reproduced, the original pixel value U=R+Y also cannot be reproduced.

Accordingly, to completely reproduce U, additional information that compensates the information lost in the quantization of X must be separately transmitted.

Embodiment 1

The present Embodiment corresponds to the first aspect of the present invention.

The method for progressive lossless video coding according to Embodiment 1 encodes the information lost in this quantization efficiently, as described below.

For instance, the value of coefficient A in equation (5) is subjected to quantization and transmitted, therefore, the correct value of A before quantization is not known on the decoding side. Here, the quantization method on the coding side is known, therefore, the range that A can take is known. That is, taking the example of the quantization method of H.264 software JM (reference: http://bs.hhi.de/~suehring/tml/, "JM Reference Software Version 8.4", July 2004), the quantized value $\text{level}_A$ can be found, as below.

$$|\text{level}_A|=(|A|*qc_A+qp\text{const})>>q\text{bits} \qquad (10)$$

Here, ">>" is the right bit shift operator. The positive/negative sign of $\text{level}_A$ matches the positive/negative sign of A. Here, $qc_A$ is an integer determined by JM corresponding to the position of A and the quantization parameters; qpconst is an integer determined by JM corresponding to the coding mode and the quantization parameters, and qbits is an integer determined by JM corresponding to the quantization parameters.

On the decoding side, the quantization parameters, the coding mode, and the quantization method can be known; therefore, $\text{level}_A$, qpconst, and qbits common to those on the coding side can be acquired. First, the following are determined from the value of $\text{level}_A$.

$$x=|\text{level}_A|<<q\text{bits}$$

$$y=x+(1<<q\text{bits})-1$$

$$m\text{min}=(x-qp\text{const}+qc_A-1)/qc_A$$

$$m\text{max}=(y-qp\text{const})/qc_A$$

Here, "<<" is the left bit shift operator, "/" is an integer division for rounding numbers down after the decimal point. The upper and lower limits $A_{min}$ and $A_{max}$ are determined as given below.

$$A_{min} = \begin{cases} -m\text{max} & (\text{if } \text{level}_A < 0) \\ -m\text{max} & (\text{if } \text{level}_A = 0) \\ m\text{min} & (\text{if } \text{level}_A > 0) \end{cases} \qquad (11)$$

$$A_{max} = \begin{cases} -m\text{min} & (\text{if } \text{level}_A < 0) \\ m\text{max} & (\text{if } \text{level}_A = 0) \\ m\text{max} & (\text{if } \text{level}_A > 0) \end{cases} \qquad (12)$$

In this way, the following upper and lower limits that the coefficient before quantization can take, can be obtained.

$$\text{Lower limits } A_{min}, B_{min}, C_{min}, \ldots, \text{ and } P_{min} \qquad (13)$$

$$\text{Upper limits } A_{max}, B_{max}, C_{min}, \ldots, \text{ and } P_{max} \qquad (14)$$

The ranges of these numerical values correspond to the "existential space of transform coefficients" of the first aspect of the present invention.

By executing the 16-nested loops (corresponding to the "enumerating step" of the first aspect of the present invention) as given in algorithm 1 shown below based on the upper and lower limits, all valid items in the space after the orthogonal transformation can be enumerated without omission. The process below corresponds to the "validity judgment" of the first aspect of the present invention.

All elements of R are integers

All elements of U lie in the range of 8-bit integers [0-255]

As a result of the validity judgment mentioned above, the total number of grid points enumerated can be assigned to cases, while the "serial numbers" of grid points matching orthogonal transform coefficients of the residual signals can be assigned to index.

[Algorithm 1]

1. index ← 0
2. cases ← 0
3. for A ← $A_{min}$ to $A_{max}$
4. for B ← $B_{min}$ to $B_{max}$
5. for C ← $C_{min}$ to $C_{max}$ -continued

[Algorithm 1]

6. for D←$D_{min}$ to $D_{max}$
7. for E←$E_{min}$ to $E_{max}$
8. for F←$F_{min}$ to $F_{max}$
9. for G←$G_{min}$ to $G_{max}$
10. for H←$H_{min}$ to $H_{max}$
11. for I←$I_{min}$ to $I_{max}$
12. for J←$J_{min}$ to $J_{max}$
13. for K←$K_{min}$ to $K_{max}$
14. for L←$L_{min}$ to $L_{max}$
15. for M←$M_{min}$ to $M_{max}$
16. for N←$N_{min}$ to $N_{max}$
17. for O←$O_{min}$ to $O_{max}$
18. for P←$P_{min}$ to $P_{max}$
19.   begin
20.     R←$T^{-1}$x$(T^t)^{-1}$ (* Equation (8) *)
21.     if all elements of R are integers
22.       then (* A to P are valid results of orthogonal transformation of integer signals *)
23.         U←R+Y (* Equation (9) *)
24.         if all elements of U lie in the range of 8-bit integers [0-255]
25.           then (* A to P are valid results of orthogonal transformation of residual signals *)
26.             if X matches the original transform coefficient
27.               then index ←cases
28.             endif
29.             cases ←cases + 1
30.           endif
31.     endif
32.   end
33. index coded using the information amount corresponding to cases

Embodiment 2

Speed Up Using Integer Value Relationship Between Transform Coefficients

The present Embodiment corresponds to the second aspect of the present invention.

In the Embodiment 1, the total loop frequency is extremely large because of executing each of the 16-nested loops in one interval. In Embodiment 2, however, the integer relationship existing between orthogonal transform coefficients is used. Thus, the loop frequency can be significantly reduced while the coding efficiency remains the same.

First, by re-arranging the elements of the 4×4 matrix R from the top row to the bottom row sequentially, the 16-dimensional row vector $\uparrow x$ can be obtained.

$$\uparrow x = [a,b,c,d,e,f,g,h,i,j,k,l,m,n,o,p] \quad (15)$$

Equation (3) can be re-written using this 16-dimensional vector, as shown below.

$$A = \uparrow t_A \uparrow x^t$$

$$B = \uparrow t_B \uparrow x^t$$

$$\ldots$$

$$P = \uparrow t_P \uparrow x^t$$

Where, $\uparrow t_A = [1,1,1,1,1,1,1,1,1,1,1,1,1,1,1,1,]$ $\uparrow t_B = [2,1,-1,-2,2,1,-1,-2,2,1,-1,-2,2,1,-1,-2]$ $\uparrow t_C = [1,-1,-1,1,1,-1,-1,1,1,-1,-1,1,1,-1,-1,1,]$ $\uparrow t_D = [1,-2,2,-1,1,-2,2,-1,1,-2,2,-1,1,-2,2,-1]$ $\uparrow t_E = [2,2,2,2,1,1,1,1,-1,-1,-1,-1,-2,-2,-2,-2]$ $\uparrow t_F = [4,2,-2,-4,2,1,-1,-2,-2,-1,1,2,-4,-2,2,4]$ $\uparrow t_G = [2,-2,-2,2,1,-1,-1,1,-1,1,1,-1,-2,2,2,-2]$ $\uparrow t_H = [2,-4,4,-2,1,-2,2,-1,-1,2,-2,1,-2,4,-4,2]$ $\uparrow t_I = [1,1,1,1,-1,-1,-1,-1,-1,-1,-1,-1,1,1,1,1]$ $\uparrow t_J = [2,1,-1,-2,-2,-1,1,2,-2,-1,1,2,2,1,-1,-2]$ $\uparrow t_K = [1,-1,-1,1,-1,1,1,-1,-1,1,1,-1,1,-1,-1,1]$ $\uparrow t_L = [1,-2,2,-1,-1,2,-2,1,-1,2,-2,1,1,-2,2,-1]$ $\uparrow t_M = [1,1,1,1,-2,-2,-2,-2,2,2,2,2,-1,-1,-1,-1]$ $\uparrow t_N = [2,1,-1,-2,-4,-2,2,4,4,2,-2,-4,-2,-1,1,2]$ $\uparrow t_O = [\mathbf{1,-1,-1,1,-2,2,2,-2,2,-2,-2,2,-1,1,1,-1}]$ $\uparrow t_P = [1,-2,2,-1,-2,4,-4,2,2,-4,4,-2,-1,2,-2,1]$ Here, calculating $\uparrow t_A + \uparrow t_C$ gives:

$$\uparrow t_A + \uparrow t_C = [2, 0, 0, 2, 2, 0, 0, 2, 2, 0, 0, 2, 2, 0, 0, 2]$$
$$= 2[1, 0, 0, 1, 1, 0, 0, 1, 1, 0, 0, 1, 1, 0, 0, 1]$$

Therefore, $$A + C = (\uparrow t_A + \uparrow t_C) \uparrow x^t$$
$$= 2[1, 0, 0, 1, 1, 0, 0, 1, 1, 0, 0, 1, 1, 0, 0, 1]\uparrow x^t$$

Thus, A+C is always an even number for any arbitrary integer element vector $\uparrow x$.

That is, if the value of A is known, the lower order first bit of C is seen to be the same as that of A, and the existential range of C is:

$$C_{min}+((C_{min}+A)\&1) \leq C \leq C_{max}-((C_{max}+A)\&1) \quad (16)$$

Thus, C exists sparsely in this range in the interval 2. Here, '&' is the bit AND operator.

The same holds true for the following, which are in the same positional relationships:
  E and G
  I and K
  M and O In the vertical direction, similarly, A+I is even; therefore, if the value of A is known, the range of I existing in interval 2 can be known. The same holds true for the following, which are in the same positional relationships:
  B and J
  C and K
  D and L Next, B+(C>>1)+(A>>1) is always even for any arbitrary integer element vector $\uparrow x$. This is verified by varying each element of $\uparrow x$ through 0, 1, 2, and 3 and confirming that it is even. That is, if the values of A and C are known, the lower order first bit of B is seen to be the same as that of (C>>1)+(A>>1). Therefore, similar to the above, the existential range of B is known, in which B exists in interval 2. The same holds true for the following, which are in the same positional relationships and in the same positional relationships vertically.
  F and (E>>1)+(G>>1)
  J and (I>>1)+(K>>1)
  N and (M>>1)+(O>>1)
  E and (A>>1)+(I>>1)
  F and (B>>1)+(J>>1)
  G and (C>>1)+(K>>1)
  H and (D>>1)+(L>>1)

Next, $$2.5(\uparrow t_A + \uparrow t_C) + 2\uparrow t_B + \uparrow t_D = [10, 0, 0, 0, 10, 0, 0, 0, 10, 0, 0,$$
$$0, 10, 0, 0, 0] = 10[1, 0, 0, 0, 1, 0, 0, 0, 1, 0, 0, 0, 1, 0, 0, 0]$$

Thus, 2B+D+2.5 (A+C) always becomes a multiple of 10 for any arbitrary integer element vector $\uparrow x$.

That is, if the values of A, B and C are known, the sum of a residue modulo 10 of D (D mod 10) and 2.5 (A+C)+2B becomes 0 or 10. Therefore, the existential range of D can be known, and D exists in this range in the interval 10.

The same holds true for those which are in the same positional relationships and the same vertical positional relationships, for instance, between M and A, E and I.

The operator mod y, which is the residue modulo of integer y used here, is the same as the remainder operator '%' used in languages such as the C language for non-negative integer $x \geq 0$. That is, x mod y=x % y.

With respect to the negative integer x<0, the % operator becomes an odd function as shown below.

$$x\%y=-((-x)\%y)$$

However, here, to ensure that the result does not become negative, mod y is taken as: x mod y=(x % y)+y (for x<0)

For instance, (−1) mod 10=9

Moreover, $$\uparrow t_A + \uparrow t_C + \uparrow t_I + \uparrow t_K = [4, 0, 0, 4, 0, 0, 0, 0, 0, 0, 0,$$
$$0, 4, 0, 0, 4] = 4[1, 0, 0, 1, 0, 0, 0, 0, 0, 0, 0, 0, 1, 0, 0, 1]$$

Accordingly, A+C+I+K is always a multiple of 4 for any arbitrary integer element vector $\uparrow x$.

That is, if the values of A, C, and I are known, the sum of the residue modulo 4 of K and (A+C+I) becomes 0 or 4; therefore, the existential range of K can be known, and K exists in this range in interval 4.

Relationships such as given below also exist.

$$\uparrow t_B - \uparrow t_J + \uparrow t_E - \uparrow t_G = [0, 4, 4, 0, 4, 4, 0, -4, 4, 0, -4, -4, 0, -4,$$
$$-4, 0] = 4[0, 1, 1, 0, 1, 1, 0, -1, 1, 0, -1, -1, 0, -1, -1, 0]$$

$$2.5(\uparrow t_A + \uparrow t_C + \uparrow t_I + \uparrow t_K + 2(\uparrow t_E + \uparrow t_G) + \uparrow t_M +$$
$$\uparrow t_O = [20, 0, 0, 20, 0, 0, 0, 0, 0, 0, 0, 0, 0, 0, 0, 0] =$$
$$20[1, 0, 0, 1, 0, 0, 0, 0, 0, 0, 0, 0, 0, 0, 0, 0]$$

$$2.5(\uparrow t_A + \uparrow t_C + \uparrow t_I + \uparrow t_K) + 2(\uparrow t_B + \uparrow t_J) + \uparrow t_D + \uparrow t_L = [$$
$$20, 0, 0, 0, 0, 0, 0, 0, 0, 0, 0, 20, 0, 0, 0] =$$
$$20[1, 0, 0, 0, 0, 0, 0, 0, 0, 0, 0, 0, 1, 0, 0, 0]$$

$$6.25(\uparrow t_A + \uparrow t_C + \uparrow t_I + \uparrow t_K) + 5(\uparrow t_B + \uparrow t_E + \uparrow t_G + \uparrow t_J) +$$
$$2.5(\uparrow t_D + \uparrow t_L + \uparrow t_M + \uparrow t_O) + 4\uparrow t_F + 2(\uparrow t_H + \uparrow t_N) +$$
$$\uparrow t_P = [100, 0, 0, 0, 0, 0, 0, 0, 0, 0, 0, 0, 0, 0, 0, 0] =$$
$$100[1, 0, 0, 0, 0, 0, 0, 0, 0, 0, 0, 0, 0, 0, 0, 0]$$

That is, if multiple loops are executed as shown below, the total number of loops can be reduced compared to looping each "for"-loop in 1 interval as follows:

1/(2*2*10*2*2*10*4*2*2*10*4*20*10*20*100)=1/409,600,000,000

1) Range of A looped in 1 interval
2) Range of C looped in 2 intervals (using A)
3) Range of B looped in 2 intervals (using A and C)
4) Range of D looped in 10 intervals (using A, B, and C)
5) Range of I looped in 2 intervals (using A)
6) Range of E looped in 2 intervals (using A and I)
7) Range of M looped in 10 intervals (using A, I, and E)
8) Range of K looped in 4 intervals (using A, C, and I)
9) Range of G looped in 2 intervals (using E)
10) Range of F looped in 2 intervals (using E and G)
11) Range of H looped in 10 intervals (using E, F, and G)
12) Range of J looped in 4 intervals (using B, E, and G)
13) Range of L lopped in 20 intervals (using A, B, C, D, I, J, and K)
14) Range of N looped in 10 intervals (using B, F, and J)
15) Range of O looped in 20 intervals (using A, C, E, G, I, K, and M)
16) Range of P looped in 100 intervals (using A to O)

More specifically, the procedure is as given in algorithm 2. Here, $C'_{min}$, $B'_{min}$ and $D'_{min}$ are found by using:

$$f(x,y)=(-x) \bmod y \qquad (17)$$

as given below.

$$C'_{min}=C_{min}+f(C_{min}+A,2) \qquad (18)$$

$$B'_{min}=B_{min}+f(B_{min}+(A>>1)+(C>>1),2) \qquad (19)$$

$$D'_{min}=D_{min}+f(D_{min}+2B+2.5(A+C),10) \qquad (20)$$

$E'_{min}$ to $P'_{min}$ are also found in a similar manner.

[Algorithm 2]

1. index ← 0
2. cases ← 0
3. for A ← $A_{min}$ to $A_{max}$ (* 1 interval only here *)
4. for C ← $C'_{min}$ to $C_{max}$ step 2
5. for B ← $B'_{min}$ to $B_{max}$ step 2
6. for D ← $D'_{min}$ to $D_{max}$ step 10
7. for I ← $I'_{min}$ to $I_{max}$ step 2
8. for E ← $E'_{min}$ to $E_{max}$ step 2
9. for M ← $M'_{min}$ to $M_{max}$ step 10
10. for K ← $K'_{min}$ to $K_{max}$ step 4
11. for G ← $G'_{min}$ to $G_{max}$ step 2
12. for F ← $F'_{min}$ to $F_{max}$ step 2
13. for H ← $H'_{min}$ to $H_{max}$ step 10
14. for J ← $J'_{min}$ to $J_{max}$ step 4
15. for L ← $L'_{min}$ to $L_{max}$ step 20
16. for N ← $N'_{min}$ to $N_{max}$ step 10
17. for O ← $O'_{min}$ to $O_{max}$ step 20
18. for P ← $P'_{min}$ to $P_{max}$ step 100
19. begin
20.   R ← $T^{-1}$×$(T^t)^{-1}$ (* Equation (8) *)
21.   if all elements of R are integers
22.     then (* A-P are valid results of orthogonal transformation of integer signals *)
23.       U ← R+Y (* Equation (9) *)
24.       if all elements of U lie in the range of 8-bit integers [0-255]
25.         then (* A-P are valid results of orthogonal transformation of residual signals*)
26.           if X matches the original transform coefficient
27.             then index ← cases
28.           endif
29.           cases ← cases + 1
30.       endif
31.   endif
32. end
33. index coded using an information amount corresponding to cases

Embodiment 3

Reduction in the Multiplicity of Loops

The present Embodiment corresponds to the third aspect of the present invention.

The algorithm of the Embodiment 1 and the algorithm of the Embodiment 2 use the 16-nested loop. In the Embodiment 3, the multiplicity of loops is reduced in order to achieve higher processing. Specifically, by separately transmitting the 8 coefficients below from the 16 A to P coefficients, the loops corresponding to these coefficients are eliminated.

A B C D
E ■ ■ ■
I ■ K ■
M ■ ■ ■

First, let us consider the transmission of coefficient A. For instance, if the following:

$$Z_A = A - A_{min}$$

is transmitted as "additional information," then by taking:

$$A = Z_A + A_{min}$$

on the decoding side, A can be restored.

Since the total number of values that A can take is $A_{max} - A_{min} + 1$, an information amount required for coding $Z_A$ becomes:

$$\log_2(A_{max} - A_{min} + 1)[bit] \quad (21)$$

Since this can be shared with the decoding side, $Z_A$ can be decoded.

The coefficients B to P can be transmitted in a similar manner as A, but the residual signal is distributed very sparsely in the space after orthogonal transformation, therefore, the encoded amount is wasted considerably. For instance, since loops associated with B are in two intervals when A and C are already known, if $Z_B = (B - B'_{min})/2$ is transmitted, B can be restored on the decoding side by $B = 2Z_B + B'_{min}$. The information amount required for coding $Z_B$ becomes $\log_2((B_{max} - B'_{min})/2 + 1)[bit]$.

The same holds true for C to K. Accordingly, by executing the procedures below:
1) Coding the value of A by $Z_A$
2) Coding is performed by $Z_C$ that has been obtained by narrowing down the range of C to about ½ (using A)
3) Coding is performed by $Z_B$ that has been obtained by narrowing down the range of B to about ½ (using A and C)
4) Coding is performed by $Z_D$ that has been obtained by narrowing down the range of D to about 1/10 (using A, B, and C)
5) Coding is performed by $Z_I$ that has been obtained by narrowing down the range of I to about ½ (using A)
6) Coding is performed by $Z_E$ that has been obtained by narrowing down the range of E about ½ (using A and I)
7) Coding is performed by $Z_M$ that has been obtained by narrowing down the range of M to about 1/10 (using A, E, and I)
8) Coding is performed by $Z_K$ that has been obtained by narrowing down the range of K to about ¼ (using A, C, and I), the eight coefficients given below from X are transmitted without waste.

A B C D
E ■ ■ ■
I ■ K ■
M ■ ■ ■

In this way, $Z_x$ with its narrowed down range corresponds to the "information excluding the values that the coefficients cannot take" of the third aspect of the present invention.

With respect to the remaining eight coefficients:

■ ■ ■ ■
■ F G H
■ J ■ L
■ N O P these are expressed as a single number index and the index is transmitted, similar to Embodiment 1.

When these are summarized, the procedure shown in algorithm 3 is obtained.

---

[Algorithm 3]

1. Encode A, C, B, D, I, E, M, and K in this order.
2. index ← 0
3. cases ← 0
4. for G ← G'$_{min}$ to G$_{max}$ step 2
5.   for F ← F'$_{min}$ to F$_{max}$ step 2
6.     for H ← H'$_{min}$ to H$_{max}$ step 10
7.       for J ← J'$_{min}$ to J$_{max}$ step 4
8.         for L ← L'$_{min}$ to L$_{max}$ step 20
9.           for N ← N'$_{min}$ to N$_{max}$ step 10
10.             for O ← O'$_{min}$ to O$_{max}$ step 20
11.               for P ← P'$_{min}$ to P$_{max}$ step 100
12.                 begin
13.                 R ← T$^{-1}$X(T$^t$)$^{-1}$ (* Equation (8) *)
14.                 if all elements of R are integers
15.                   then (* A to P are valid results of orthogonal transformation of integer signals *)
16.                     U ← R + Y (* Equation (9) *)
17.                     if all elements of U lie in the range of 8-bit integers [0-255]
18.                       then (* A to P are valid results of orthogonal transformation of residual signals*)
19.                         if X matches the original transform coefficient
20.                           then index ← cases
21.                         endif
22.                       cases ← cases + 1
23.                   endif
24.               endif
25.             end
26. index coded using an information amount corresponding to the cases

---

By the procedure above, the 16-nested loops are reduced to 8-nested loops and the processing is speeded up.

The information amount required to describe the index is:

$$\log_2 cases[bit] \quad (22)$$

This information can be possessed by the decoding side without additional information, and is information necessary for decoding the index.

Embodiment 4

Corresponding Decoding

The present Embodiment corresponds to the seventh aspect of the present invention.

Here, the embodiment of decoding corresponding to the coding of the Embodiment 3 is described. Even on the decoding side, by executing loops similar to those for coding, the values A to K and G to P become orthogonal transform coefficients corresponding to the original residual signals when the result of validity judgment of the innermost loop for (index+1) time becomes true.

When coding of index is performed according to the amount of information of index, firstly, the amount of information of index should be known for decoding this index. Thus, cases should be obtained beforehand. For this purpose, loops should be executed similar to the procedure for coding.

For instance, although additional memory is necessary, multiple loops can be executed only once as in algorithm 4 to prevent execution of multiple loops twice, and cases, index, original signals can be acquired in this order. Here, Ubuf[ ] is an array of elements of a 4×4 matrix, which is acquired dynamically or acquired in adequate quantity beforehand.

---

[Algorithm 4]

1. Decode A, C, B, D, I, E, M, and K in this order.
2. cases←0
3. for G←G'$_{min}$ to G$_{max}$ step 2
4. for F←F'$_{min}$ to F$_{max}$ step 2
5. for H←H'$_{min}$ to H$_{max}$ step 10
6. for J←J'$_{min}$ to J$_{max}$ step 4
7. for L←L'$_{min}$ to L$_{max}$ step 20
8. for N←N'$_{min}$ to N$_{max}$ step 10
9. for O←O'$_{min}$ to O$_{max}$ step 20
10. for P←P'$_{min}$ to P$_{max}$ step 100
11.   begin
12.   R←T$^{-1}$X(T$^t$)$^{-1}$(* Equation (8) *)
13.   if all elements of R are integers
14.     then (* A to P are valid results of orthogonal transformation of integer signals *)
15.       U←R+Y (* Equation (9) *)
16.       if all elements of U lie in the range of 8-bit integers [0-255]
17.         then (* A to P are valid results of orthogonal transformation of residual signals *)
18.           Ubuf [cases]←U
19.           cases ←cases + 1
20.       endif
21.     endif
22.   end
23. index decoded using the information amount corresponding to the cases
24. U←Ubuf [index] (* original signal values *)

---

Embodiment 5

High Speed Coding Amount Estimation

The present Embodiment corresponds to the sixth aspect of the present invention.

In the H.264 scheme, various prediction modes can be selected, such as multiple modes or types for intra-frame predictions, and multiple block sizes for inter-frame predictions. Since the prediction residual signal R changes depending on the prediction mode, the coding amount per mode should be correctly estimated for selecting the optimum prediction mode considering encoding amount versus distortion.

The distortion is always zero for lossless coding, thus precautions need be taken only to minimize the coding amount (sum of the coding amount complying with H.264 and coding amount of additional information).

When multiple loops are executed as shown in Algorithm 1, Algorithm 2, and Algorithm 3, naturally the correct coding amount of additional information can be estimated, but if a method of estimating coding amount faster exists, then it becomes convenient to compare multiple modes.

Embodiment 5 aims to estimate the coding amount of additional information without executing multiple loops.

Firstly, the case when specific transform coefficients are not transmitted beforehand as in Embodiment 1 and Embodiment 2, is described here. The upper and lower limits (Equations (13) and (14)) that the coefficients before quantization can take, are found beforehand. Based on these limits, the volume V of the "existential space of transform coefficients" of the sixth aspect of the present invention is determined as follows:

$$V = \prod_{x \in A, \ldots, P} (x_{max} - x_{min} + 1) \quad (23)$$

This V is considered to approximate to the number of grid points in the existential space. All the elements in it do not correspond to the original residual signals. Since the space is expanded as shown in equation (6), the following $V_0$, which is equivalent to V divided by this expansion factor, is considered to approximate to the total number of grid points.

$$V_0 = V/40^{4+4} \quad (24)$$

Accordingly, the additional information coding amount per pixel $l_0$ becomes:

$$l_0 = \log_2 V_0 / 16 \quad (25)$$
$$= \log_2 (V/40^{4+4})/16$$
$$= \log_2 V / 16 - 2.66 [bit]$$

If specific transform coefficients are transmitted beforehand as in Embodiment 3, the information amount $l_1$ can be expressed similar to Equation (21) as below.

$$l_1 = \sum_{x \in A, \ldots, K} ((x_{max} - x'_{min})/n_x + 1) \quad (26)$$

Where x comprises the following coefficients.
A B C D
E ■ ■ ■
I ■ K ■
M ■ ■ ■

Here, $n_x$ is the amount that narrows down the range mentioned earlier, and the values of A, . . . , M, are as follows:
1 2 2 10
2 ■ ■ ■
2 ■ 4 ■
10 ■ ■ ■

A'$_{min}$=A$_{min}$, C'$_{min}$ to M'$_{min}$ are determined as shown in equation (18).

The volume $V_1$ of the "existential space of transform coefficients" of the remaining eight dimensions becomes as follows:

$$V_1 = \prod_{x \in F, \ldots, P} (x_{max} - x_{min} + 1) \quad (27)$$

Here, similar to the previous case, the grid points corresponding to the original residual signals exist sparsely. The expansion factor of this space is obtained by dividing equation (6) by the product of all the $n_x$ (x∈A, . . . , M) as below.

$$n_0 = 40^{4+4} / \prod_{x \in A, \ldots, M} \quad (28)$$
$$n_x = 40^8 /(1*2*2*10*2*2*4*10)$$
$$= 1,024,000,000$$

The information amount $l_1$ per pixel of the "total number of grid points" becomes $$l_2 = \log_2(V_1/n_0)/16 \quad (29)$$
$$= \log_2 V_1/16 - 1.87 \text{ [bit]}$$

Finally, the additional information amount per pixel becomes the sum of the two:

$$l_1 + l_2 \text{[bit]} \quad (30)$$

Using the estimated values as in equations (25) and (30), the coding amount can be estimated without executing the coding using multiple loops. By selecting the mode at which the coding amount becomes minimum based on this estimated coding amount, and by actually coding only for the selected mode, near-optimal lossless coding can be realized.

Embodiment 6

Speeding Up the Validity Judgment

The present Embodiment corresponds to the fourth aspect of the present invention.

Because $T^{-1}$ is given as below, if equation (8) is calculated, floating-point calculations are necessary.

$$T^{-1} = \begin{bmatrix} 0.25 & 0.2 & 0.25 & 0.1 \\ 0.25 & 0.1 & -0.25 & -0.2 \\ 0.25 & -0.1 & -0.25 & 0.2 \\ 0.25 & -0.2 & 0.25 & -0.1 \end{bmatrix} \quad (31)$$

However, if $T^{-1}$ is multiplied by a factor of 20, we get:

$$T_0 = 20T^{-1} = \begin{bmatrix} 5 & 4 & 5 & 2 \\ 5 & 2 & -5 & -4 \\ 5 & -2 & -5 & 4 \\ 5 & -4 & 5 & -2 \end{bmatrix} \quad (32)$$

Thus, by using $T_0$ instead of $T^{-1}$, the value of 400 (=20*20) times the correct R shown below (hereinafter referred to as $R_{400}$) can be obtained only by integer operations.

$$R_{400} = 400R = T_0 X T_0^t \quad (33)$$

When defining the following equation, equation (33) can be resolved into the application of equation (34) eight times vertically and horizontally. Specifically, this calculation can be performed quickly by executing algorithm 5.

$$\begin{bmatrix} s \\ t \\ u \\ v \end{bmatrix} = T_0 \begin{bmatrix} a \\ b \\ c \\ d \end{bmatrix} \quad (34)$$

[Algorithm 5]

1. $x_0 \leftarrow 5 (a + c)$
2. $x_1 \leftarrow 5 (a - c)$
3. $x_2 \leftarrow 4b + 2c$
4. $x_3 \leftarrow 2b - 4c$
5. $s \leftarrow x_0 + x_2$

[Algorithm 5]

6. $t \leftarrow x_1 + x_3$
7. $u \leftarrow x_1 - x_3$
8. $v \leftarrow x_0 - x_2$ Here, 5x can be obtained by shifting once and adding once as in (x<<2)+x, and 4b+2c can also be obtained by shifting twice and adding once as (b<<2)+(c<<1). Thus, no multiplication is necessary in the calculation of equation (33).

Here, "all elements of R are integers," which is one of the "validity judgments" mentioned earlier, is equivalent to "all elements of $R_{400}$ are multiples of 400." If this is implemented, division is necessary to confirm that the remainder after division by 400 is zero. However, since the redundancy that the elements are multiples of 25 has already been removed when making the loops, it needs only to be confirmed that they are multiples of 16. This is equivalent to saying that the "lower 4 bits of all elements of $R_{400}$ are all 0." This is also equivalent to saying that "the result of the bit AND operation with each element and 15 (1111 in binary form) is 0," and a judgment can be made without division.

Now, it is necessary to correct the judgment that "all elements of U lie within the range of 8-bit integers [0 to 255]" as part of another "validity judgement." If equation (9) is multiplied on both sides by 400, we get:

$$U_{400} = 400U = R_{400} + Y_{400} \quad (35)$$

Here, $Y_{400}$ is the prediction signal Y multiplied by 400. If $Y_{400}$ is prepared beforehand (if a 256-element lookup table is used, multiplication by 400 is not necessary), and if its sum with $R_{400}$ is determined, then 400 times the original signal can be obtained. Since 255*400=102,000, it is sufficient to confirm that "all elements of $U_{400}$ lie in the range [0 to 102,000]."

This procedure can be summarized to arrive at a procedure similar to algorithm 6.

[Algorithm 6]

1. index←0
2. cases←0
3. for A←$A_{min}$ to $A_{max}$ (* 1 interval only here *)
4. for C←$C'_{min}$ to $C_{max}$ step 2
5. for B←$B'_{min}$ to $B_{max}$ step 2
6. for D←$D'_{min}$ to $D_{max}$ step 10
7. for I←$I'_{min}$ to $I_{max}$ step 2
8. for E←$E'_{min}$ to $E_{max}$ step 2
9. for M←$M'_{min}$ to $M_{max}$ step 10
10. for K←$K'_{min}$ to $K_{max}$ step 4
11. for G←$G'_{min}$ to $G_{max}$ step 2
12. for F←$F'_{min}$ to $F_{max}$ step 2
13. for H←$H'_{min}$ to $H_{max}$ step 10
14. for J←$J'_{min}$ to $J_{max}$ step 4
15. for L←$L'_{min}$ to $L_{max}$ step 20
16. for N←$N'_{min}$ to $N_{max}$ step 10
17. for O←$O'_{min}$ to $O_{max}$ step 20
18. for P←$P'_{min}$ to $P_{max}$ step 100
19. begin
20. $R_{400}$←$T_0 X T_0^t$ (* Equation (33) *)
21. if the lower 4 bits of all elements of $R_{400}$ are 0
22. then (* A-P are valid results of orthogonal transformation of integer signals *)
23. $U_{400}$←$R_{400}$ + $Y_{400}$ (* Equation (35) *)
24. if all elements of U400 lie in the range of [0 to 102,000]
25. then (* A-P are valid results of orthogonal transformation of
    residual signals *)
26. if X matches the original transform coefficient
27. then index ←cases

[Algorithm 6]

```
28.            endif
29.            cases ← cases + 1
30.         endif
31.     endif
32. end
33. index coded using the information amount corresponding to the cases
```

Embodiment 7

Speed-Up of Processing Using Convexity

The present Embodiment corresponds to the fifth aspect of the present invention.

$$R = \begin{bmatrix} a & b & c & d \\ e & f & g & h \\ i & j & k & l \\ m & n & o & p \end{bmatrix}$$

Considering the existential space of the residual signal R, if the prediction pixel signal at the position of the top left element a is taken as $Y_a$, then a satisfies the following existential range.

$$0 \leq a + Y_a \leq 255 \quad (36)$$

$$-Y_a \leq a \leq 255 - Y_a \quad (37)$$

The upper and lower limits are also determined in a similar manner for b to p. Considering a 16-dimensional space, the existential range $\Omega$ of R will be a convex polyhedron (hyper-rectangular solid).

Even in the 16-dimensional space obtained by transformation of the existential range of R by equation (3), the existential range after undergoing rotation and expansion is also a convex polyhedron. Although the transform coefficient X exists in this transformed space, since the upper and lower limits of each element are determined as in equations (13) and (14), $\Psi$, the existential range of X is also a convex polyhedron (hyper-rectangular solid). Consequently, $\Omega \cap \Psi$, the intersection of $\Omega$ and $\Psi$, also becomes a convex polyhedron. If these relationships are expressed in two dimensions for simplification, then they will be as shown in FIG. 1.

Figure 2:
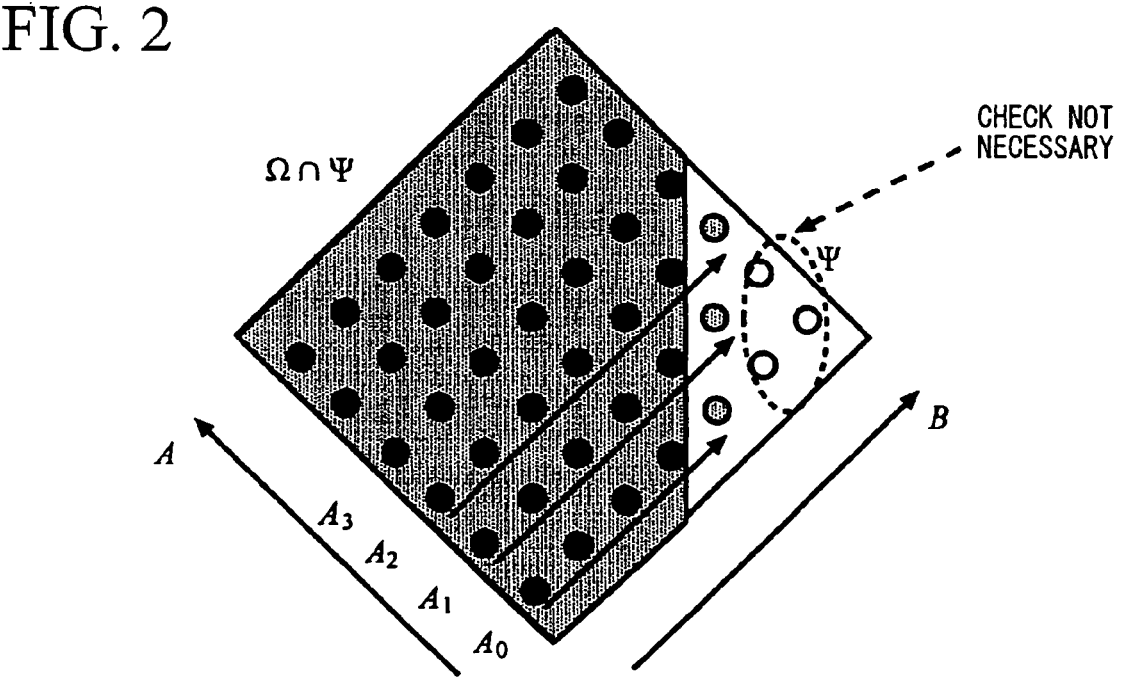
FIG. 2 is the enlarged view of the $\Psi$ area.

FIG. 2 is the expanded view of the $\Psi$ region of FIG. 1. When executing multiple loops in the steps enumerating the grid points, if B is varied with $A=A_0$ as shown in this figure, the second validity judgment (all elements of U lie within the range of 8-bit integers [0 to 255]) changes from "True" to "False" in the fifth grid point (grey color). Since the existential range $\Omega \cap \Psi$ is convex, "False" can be verified after the sixth grid point, therefore, B loop is stopped and the next B loop is re-started with $A=A_1$. In this case, the validity judgment changes from "True" to "False" at the sixth grid point (grey color), therefore the loop is stopped. In this way, the judgment on the part surrounded by the dashed line in the figure can be suspended.

When the above is summarized, the procedure becomes similar to that in algorithm 7. If the procedure for suspending the validity judgment of all coefficients is shown, the indentation becomes too deep, therefore for simplification, the procedure for suspending the validity judgment related to 3 variables (N, O, and P) in the innermost of the multiple loops is shown; it is adequate to show the generality here.

[Algorithm 7]

```
1.  index ← 0
2.  cases ← 0
3.  for A ← A_min to A_max
4.  for B ← B_min to B_max
5.  for C ← C_min to C_max
6.  for D ← D_min to D_max
7.  for E ← E_min to E_max
8.  for F ← F_min to F_max
9.  for G ← G_min to G_max
10. for H ← H_min to H_max
11. for I ← I_min to I_max
12. for J ← J_min to J_max
13. for K ← K_min to K_max
14. for L ← L_min to L_max
15. for M ← M_min to M_max
16. begin
17. CheckN ← False
18. for N ← N_min to N_max
```

-continued 19. begin

20. $CheckO \leftarrow False$ 21. for $O \leftarrow O_{min}$ to $O_{max}$ 22. begin 23. $CheckP \leftarrow False$ 24. for $P \leftarrow P_{min}$ to $P_{max}$ 25. begin 26. $R \leftarrow T^{-1} X (T^t)^{-1}$ (*Equation (8)*)

27. if all elements of $R$ are integers 28. then (*$A - P$ are valid results of orthogonal transformation of integer signals*)

29. $U \leftarrow R + Y$ (*Equation (9)*)

30. if all elements of $U$ lie in the range of 8-bit integers [0 to 255]

31. then (*$A - P$ are valid results of orthogonal transformation of residual signals*)

32. if $X$ matches the original transform coefficient 33. then index $\leftarrow$ cases 34. *endif*

35. Check $N \leftarrow$ True

36. Check $O \leftarrow$ True

37. Check $P \leftarrow$ True 38. cases $\leftarrow$ cases + 1

39. else if $CheckP$ = True 40. then *goto* 21 (* the validity judgment changes from True to False *)

41. *endif*

42. *endif*

43. end 44. if $CheckP$ = False and $CheckO$ = True 45. then *goto* 18 (* the validity judgment changes from True to False *)

46. *endif*

47. end 48. if $CheckP$ = False and $CheckO$ = False and $CheckN$ = True 49. then *goto* 15 (* True changes to *False**)

50. *endif*

51. end 52. end 53. index coded using the informaiton amount corresponding to the cases

Embodiment 8

Example of Configuration of Coding Apparatus

The present Embodiment corresponds to the eighth aspect of the present invention.

Figure 3:
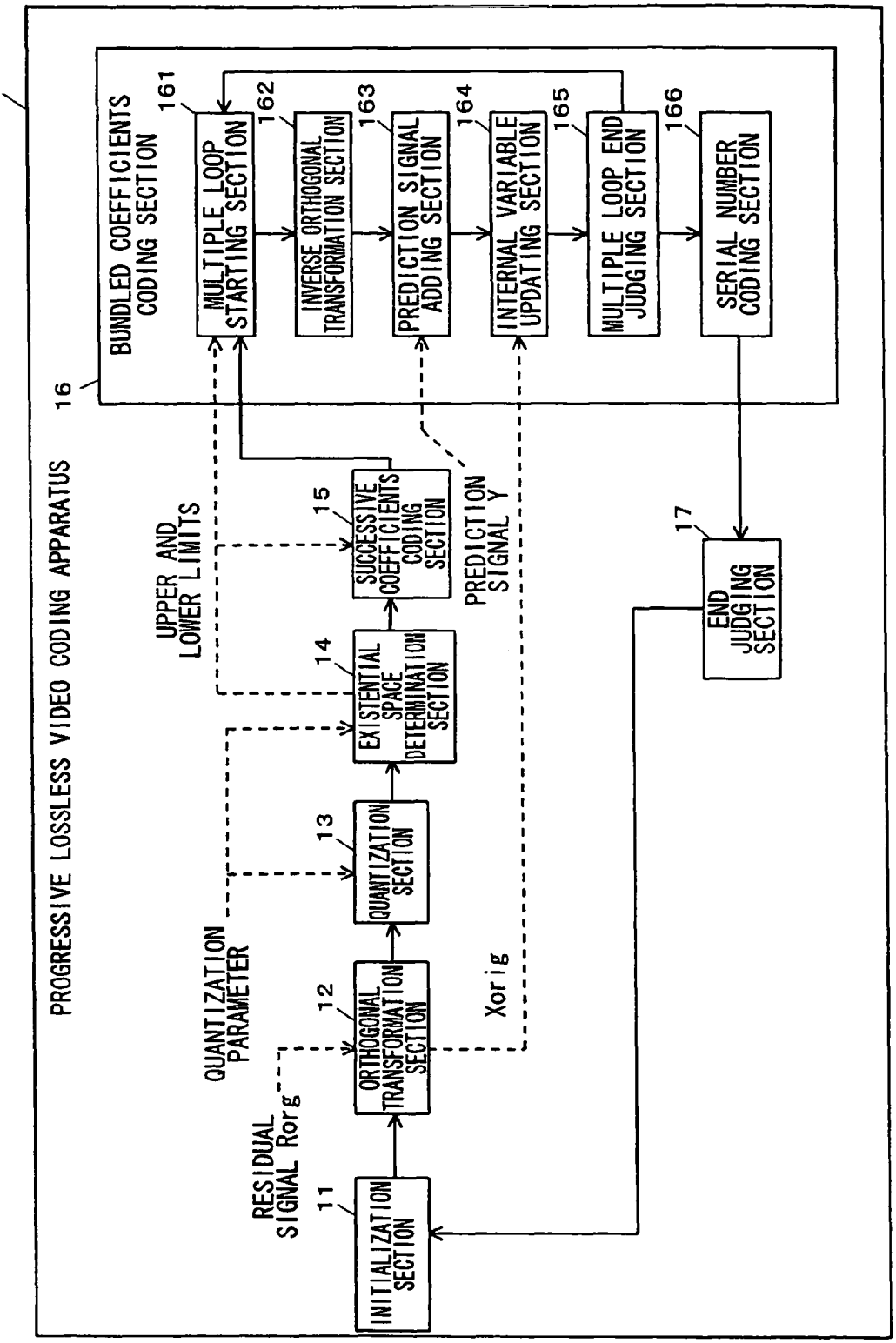
FIG. 3 shows an example of the configuration of a progressive lossless video coding apparatus.

The configuration of apparatus for realizing the present invention is described below. FIG. 3 shows an example of the configuration of a progressive lossless video coding apparatus of the present invention. In addition to a section (not shown in FIG. 3) that calculates, for each block, the residual signal Rorig between an original image signal and a predicted image signal obtained by time prediction in inter-flame coding or space prediction in intra-frame coding based on the H.264 standard coding scheme, the progressive lossless video coding apparatus 1 is provided with: an initialization section 11 that initializes cases and index; an orthogonal transformation section 12 that orthogonally transforms the residual signal Rorig; a quantization section 13 that quantizes the output of the orthogonal transformation section 12; an existential space determination section 14 that determines upper and lower limit information $A_{min}, A_{max}, \ldots, P_{min}$, and $P_{max}$; a successive coefficients coding section 15 that codes coefficients to be transmitted successively in a coded format, a bundled coefficients coding section 16 that determines and codes index, a number that represents bundled coefficients; and an end judgment section 17 that judges whether all the blocks in the image have been coded.

The bundled coefficients coding section 16 is provided with: a multiple loop starting section 161 that enumerates combinations of all coefficients within the upper and lower limits of each coefficient; an inverse orthogonal transformation section 162 that performs inverse orthogonal transformation of a 4×4 matrix X established by coefficients in the existing loop and coefficients already coded and transmitted; a prediction signal adding section 163 that determines the sum of matrices U=R+Y; an internal variable updating section 164 that updates index and cases; a multiple loop end judging section 165 that judges whether combinations of all coefficients within the upper and lower limits of each coefficient have been examined or not; and a serial number coding section 166 that codes the index.

The progressive lossless video coding apparatus 1 shown in FIG. 3 works as described below. First, the initialization section 11 initializes the "total number of grid points" cases and the "serial numbers" index of grid points that match the orthogonal transform coefficients of residual signals, respectively to 0.

Next, the orthogonal transformation section 12 applies orthogonal transformation to the residual signal Rorig to obtain Xorig. The quantization section 13 quantizes this Xorig using the information on quantization parameters. From this quantization information, the existential space determination section 14 determines the information on upper and lower limits $A_{min}$, $A_{max}$, ..., $P_{min}$, and $P_{max}$.

Next, the successive coefficients coding section 15 codes the coefficients to be transmitted successively in a coded format. For instance, in case of the Embodiment 1 mentioned above, no coefficients are coded; while in case of the Embodiment 3, eight coefficients, namely A, C, B, D, I, E, M, and K, are coded.

Next, the bundled coefficients coding section 16 determines and codes the index which is a number that bundles and represents the remaining coefficients. That is, the multiple loop starting section 161 in the bundled coefficients coding section 16 enumerates all the ranges that the remaining coefficients (for instance, 16 coefficients from A to P in case of Embodiment 1, and 8 coefficients, namely G, F, H, J, L, N, O and P in case of Embodiment 3) can take within the upper and lower limits thereof. In this case, impossible combinations of coefficients may be bypassed using the integer value relationship between coefficients, as in Embodiment 2.

The inverse orthogonal transformation section 162 performs inverse orthogonal transformation of the 4×4 matrix X established by coefficients A to P in the present loop and coefficients already coded and transmitted, to obtain R. If non-integer values exist in R, the flow advances to the process of the multiple loop end judging section 165.

Next, the prediction signal adding section 163 find the sum of matrices U=R+Y. Here, if an element of U that does not lie in the range [0 to 255] exists, the flow advances to the process of the multiple loop end judging section 165.

Next, if X and Xorig match, then the internal variable updating section 164 substitutes cases for index. Moreover, 1 is added to cases.

The multiple loop end judging section 165 judges whether all combinations of coefficients within the upper and lower limits have been examined. If they have not been examined, the flow returns the processing to the multiple loop starting section 161. If the examination has been completed, the serial number coding section 166 codes index using the information amount of the cases.

Next, the end judging section 17 judges whether all blocks in the image have been coded. If not, the flow moves to the processing for the next block and the initialization section 11 restarts the processing. If completed, coding ends.

[If Universal Variable Length Code is Used for Coding the Index]

In the present invention, the universal variable length code (Reference: Y. Itoh, N-M Cheung: "Universal variable length code for DCT coding," IEEE Proc. Int. Conf. Image Processing, Vol. 1, pp. 940-943, 2000), for instance, may be used to code the index without using cases. In this case, if X and Xorig match in the internal variable updating section 164, then universal variable length coding of the value of cases at that time is performed, and the processing by the bundled coefficients coding section 16 ends immediately.

Embodiment 9

Example of Configuration of Decoding Apparatus

The present Embodiment corresponds to the ninth aspect of the present invention.

Figure 4:
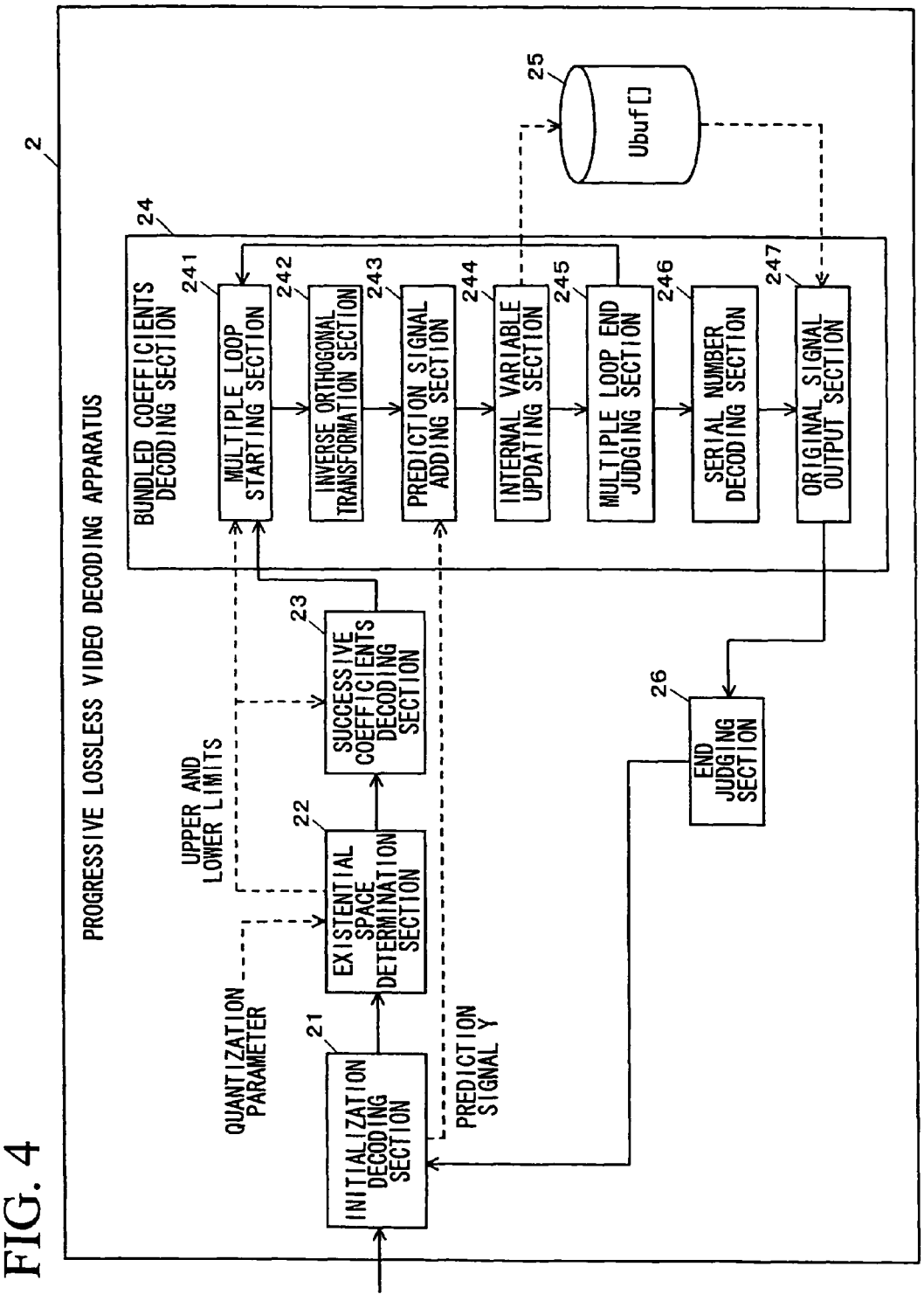
FIG. 4 shows an example of the configuration of a progressive lossless video decoding apparatus.

FIG. 4 shows an example of the configuration of the progressive lossless video decoding apparatus of the present invention. The progressive lossless video decoding apparatus 2 is provided with: an initialization decoding section 21 that decodes quantization parameters and quantization coefficients, and also generates a prediction signal Y; an existential space determination section 22 that determines information on upper and lower limits $A_{min}$, $A_{max}$, ..., $P_{min}$, and $P_{max}$; a successive coefficients decoding section 23 that decodes coefficients which are successively coded and transmitted; a bundled coefficients decoding section 24 that decodes index, a number that bundles and represents the coefficients; Ubuf[ ] 25, an array storage that stores values of U; and an end judging section 26 that judges whether all the blocks in the image have been decoded.

The bundled coefficients decoding section 24 is provided with: a multiple loop starting section 241 that enumerates combinations of all coefficients within the upper and lower limits of each coefficient; an inverse orthogonal transformation section 242 that performs inverse orthogonal transformation of a 4×4 matrix X established by coefficients in the existing loop and coefficients already decoded; a prediction signal adding section 243 that determines the sum of matrices U=R+Y; an internal variable updating section 244 that stores U in the address of Ubuf [ ]25 designated by the cases and updates cases; a multiple loop end judging section 245 that judges whether combinations of all coefficients have been examined within the upper and lower limits of each coefficient; a serial number decoding section 246 that decodes index; and an original signal output section 247 that outputs the value of an element of Ubuf [ ]25 specified by index as the original image signal.

The progressive lossless video decoding apparatus 2 shown in FIG. 4 works as described below. First, the initialization decoding section 21 initializes cases, the total number of grid points to 0, decodes the quantization parameters and quantization coefficients, and generates the prediction signal Y.

Based on the quantization parameters and the quantization coefficients, the existential space determination section 22 finds the information on upper and lower limits $A_{min}$, $A_{max}$, ..., $P_{min}$, and $P_{max}$.

Next, the successive coefficients decoding section 23 decodes the coefficients that have been successively coded and transmitted. For instance, in case of the Embodiment 1, no coefficients are decoded; while in case of the Embodiment 3, eight coefficients, namely A, C, B, D, I, E, M, and K are decoded in this order.

Next, the bundled coefficients decoding section 24 decodes the index, which is a number that bundles and represents the remaining coefficients, and performs lossless restoration. That is, the multiple loop starting section 241 in the bundled coefficients decoding section 24 enumerates all the ranges that the remaining coefficients (for instance, 16 coefficients from A to P in case of Embodiment 1, and 8 coefficients, namely G, F, H, J, L, N, O, and P in case of Embodiment 3) can take within the upper and lower limits thereof.

In this case, impossible combinations of coefficients may be bypassed using the integer value relationship between coefficients, as in Embodiment 2. However, the procedure for bypassing impossible combinations of coefficients and enumerating is exactly the same as the procedure for the corresponding coding apparatus.

The inverse orthogonal transformation section 242 performs inverse transformation of the 4×4 matrix X established by the coefficients A to P in the existing loop and the coefficients decoded already, to obtain R. If non-integer values exist in R, the flow advances to the process of the multiple loop end judging section 245.

Next, the prediction signal adding section 243 find the sum of matrices U=R+Y. Here, if the value of an element of U that does not lie in the range [0 to 255] exists, the flow advances to the process of the multiple loop end judging section 245.

Next, the internal variable updating section 244 stores U in the address of Ubuf [ ] 25 specified by cases ensured beforehand and adds 1 to cases.

The multiple loop end judging section 245 judges whether all combinations of coefficients within the upper and lower limits have been examined. If they have not been examined yet, the flow returns the processing to the multiple loop starting section 241. If the examination has been completed, the serial number decoding section 246 decodes the index using the information amount corresponding to the cases.

Next, the original signal output section 247 extracts the value of the Ubuf [ ] 25 specified by index, and outputs it as the original image signal.

Next, the end judging section 26 judges whether all blocks in the image have been decoded. If not, the flow moves to the process for the next block and the initialization decoding section 21 restarts the processing. If they have been decoded, the decoding ends.

[Example of Configuration of Decoding Apparatus when Universal Variable Length Code is Used in the Coding of the Index]

Figure 5:
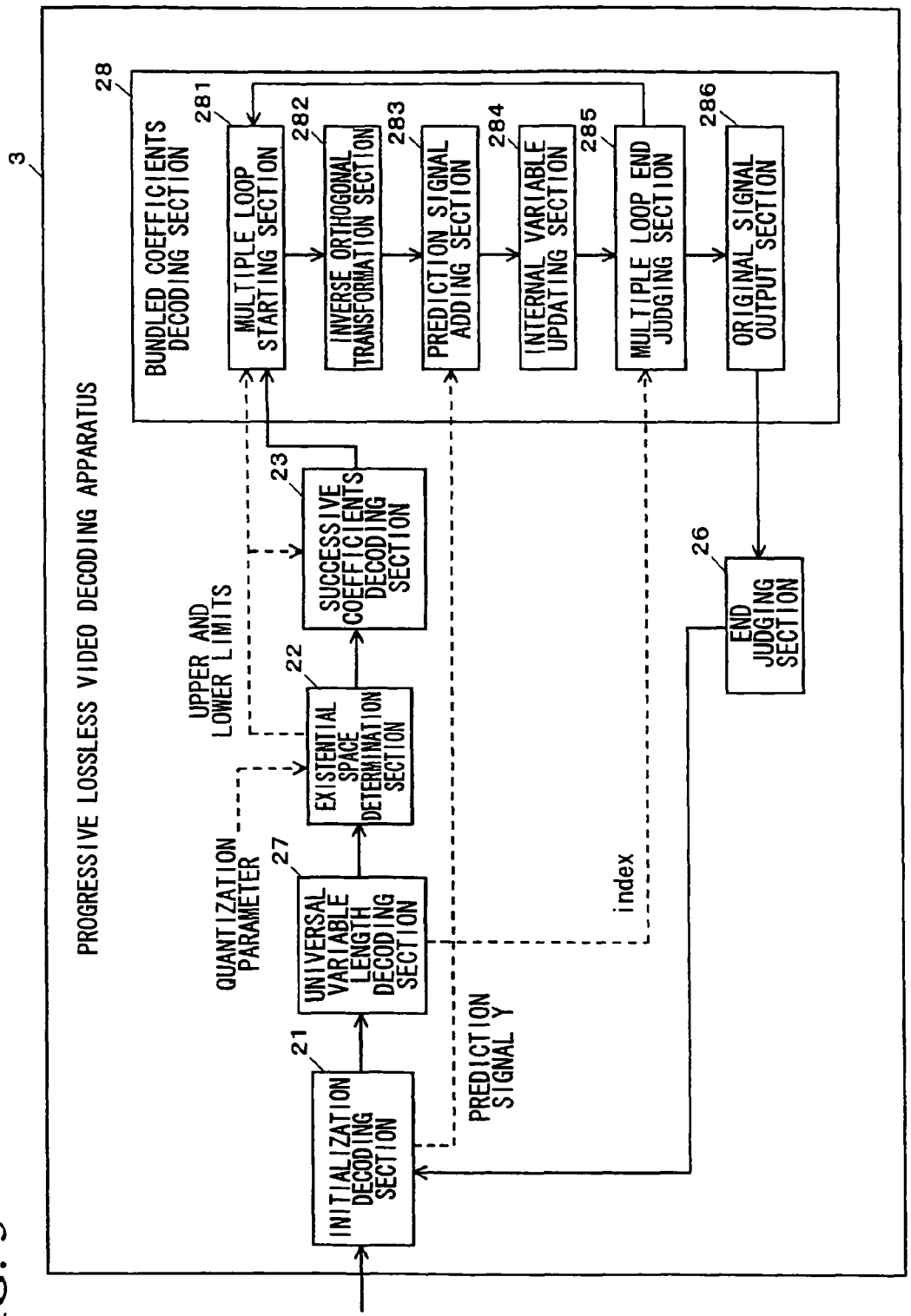
FIG. 5 shows an example of the configuration of a progressive lossless video decoding apparatus when universal variable length code is used for coding the index.

When universal variable length code is used for coding the index in the present invention, the configuration of functional blocks becomes similar to that shown in FIG. 5 on the decoding side. In the progressive lossless video decoding apparatus 3 shown in FIG. 5, the universal variable length decoding section 27 decodes the index, the multiple loop end judging section 285 judges whether the number of times multiple loops have been executed is the same as the index, and if it is, judges end of the processing immediately, and outputs the value of U at that stage as the original signal. Consequently, the array storage such as Ubuf [ ] 25 shown in FIG. 4 is not necessary. The operation of other parts is the same as in the example described in FIG. 4.

Example 1

Example 1 corresponding to Embodiment 3 is described here. An overview of the core processing in Example 1 is described below.

Input: Quantization parameter, prediction signal Y, and original residual signal Rorig Process: A part of the orthogonal transform coefficients corresponding to the original signals is converted to compressed information, and the rest of the coefficients are expressed as serial numbers among those that enumerate all combinations that can become original signals without omission.

Output: Compressed information ($Z_A$ to $Z_K$) that expresses a part of the coefficients (A, C, B, D, I, E, M, and K), and code (index) that represents one number summarizing the remaining coefficients (G, F, H, J, L, N, O, and P)

Figure 6:
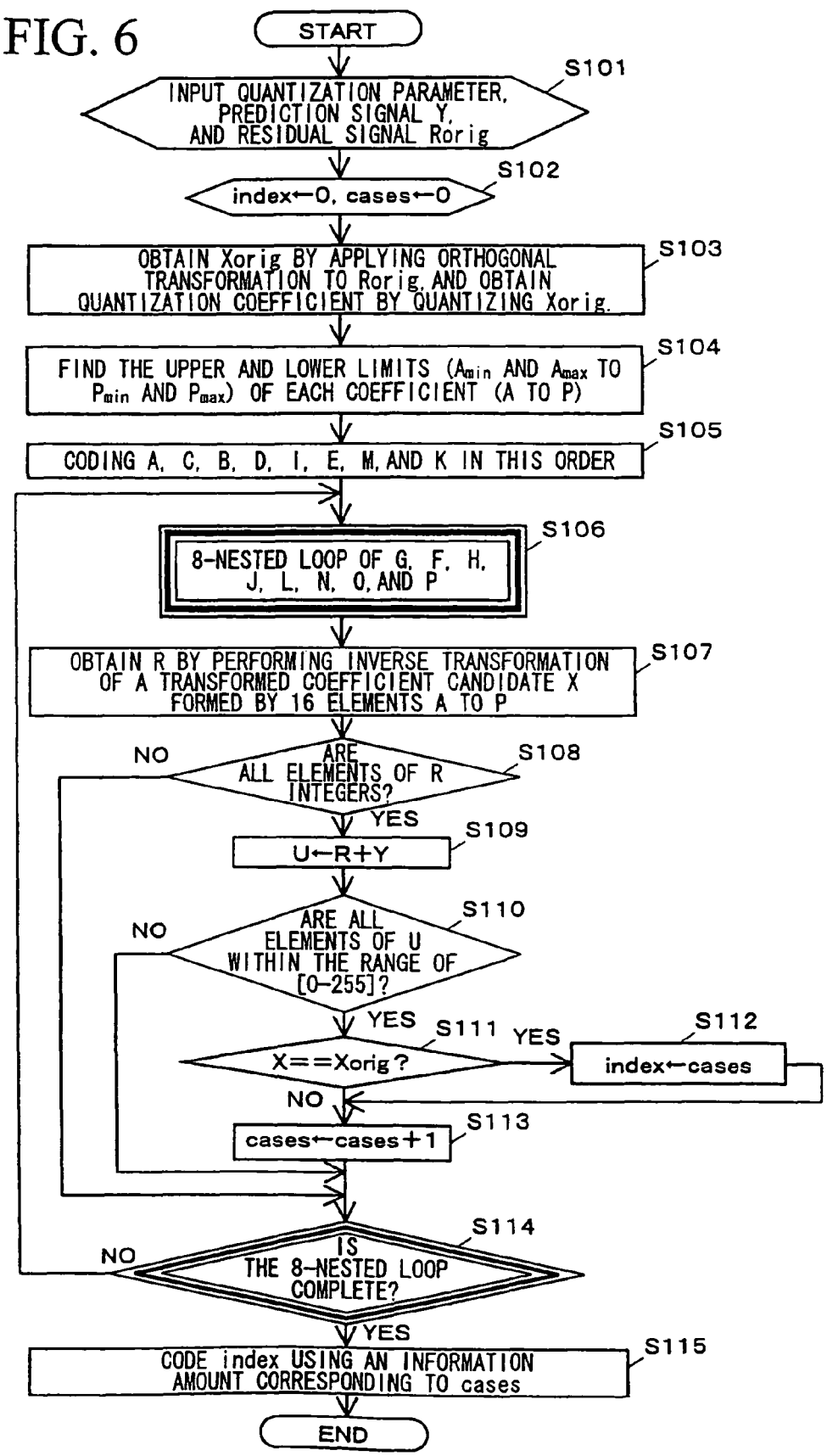
FIG. 6 shows the process flow of Example 1.

Example 1 is described here referring to the process flow shown in FIG. 6. Firstly, the quantization parameter, the prediction signal Y, and the original residual signal Rorig are input in step S101. Next, both index and cases are initialized to 0 in step S102.

Next, orthogonal transformation is applied to Rorig in step S103 to obtain original transform coefficient Xorig. At the same time, the quantization coefficient obtained by quantizing Xorig is also determined. In step S104, the upper and lower limits of each element (A to P) of X, which is an estimated matrix of Xorig that has been determined from the quantization parameters and quantization coefficients obtained until now. Based on these, A, C, B, D, I, E, M, and K are subjected to compressive coding sequentially in step S105.

Next, the flow advances the 8-nested loop for G, F, H, J, L, N, O, and P (step S106 to step S114). In step S107, R is obtained by inverse transformation of the 4×4 matrix X formed by the present values of A to P using equation (8).

In step S108, it is confirmed that all the elements of R are integers. If false, the flow moves to step S114; if true, the flow moves to step S109 to calculate U=R+Y.

Next, in step S110, all elements of U are checked to confirm whether they lie within the range of [0-255]. If false, the flow moves to step S114; if true, the flow moves to step S110, to confirm whether X is equal to the original transform coefficient Xorig. If this is true, the value of the present cases is stored in the variable index in step S112. 1 is added to the value of cases in step S113 and the flow moves to step S114.

A check is made in step 114 to confirm that all the 8-nested loops have been completed. If false, the flow returns to step S106, which is the beginning of the loop. If true, in step S115, the index is coded using the information amount (equation (22)) of the cases (total number of grid points) already found, and the processing ends.

Here, an example of the process of separately coding (step S105) firstly a part of the coefficients (eight coefficients A, C, B, D, I, E, M, and K) beforehand was shown. However, if this is omitted, and if step S106 to step S114 are made multiple loops of all 16 coefficients, an example corresponding to Embodiment 1 or Embodiment 2 with exactly the same framework can be obtained.

Example 2

Example 2 corresponding to Embodiment 4 is described here. An overview of the core processing in Example 2 is described below.

Input: Quantization parameter, prediction signal Y, and quantization coefficient Process: A part of the orthogonal transform coefficients (A, C, B, D, I, E, M, and K) corresponding to the original signals is decoded from the compressed information, and the rest of the coefficients (G, F, H, J, L, N, O, and P) are decoded as serial numbers that designate combinations in all enumerated combinations which can become original signals without omission.

Output: Original image signal

Example 2 is described here referring to the process flow shown in FIG. 7. Firstly, cases is initialized to 0 in step S201. Next, quantization parameters and quantization coefficients are decoded, and the prediction signal Y is generated in step S202. This information can be obtained from the H.264 basic information bit stream.

In step S203, the upper and lower limits of each coefficient (A to P) of the matrix X are found from the information obtained until now. Based on these limits, A, C, B, D, I, E, M, and K are decoded sequentially in step S204.

Next, the flow advances the 8-nested loop of G, F, H, J, L, N, O, and P (step S205 to step S212). In step S206, R is obtained by inverse transformation of the 4×4 matrix X formed by the present values of A to P using equation (8).

In step S207, all the elements of R are checked if they are integers. If false, the flow moves to step S212; if true, the flow moves to step S208 to calculate U=R+Y.

Next, in step S209, all elements of U are checked to confirm if they lie within the range of [0-255]. If this is true, the present value of U is stored in the address of the array Ubuf[ ] specified by cases in step S210, the flow moves to step S211 where 1 is added to the cases and then moves to step S212. If false, the flow moves to step S212.

In step 212, a check is made to confirm that all the 8-nested loops have been completed. If false, the process returns to step S205, which is the beginning of the loop. If true, in step S213, the index is decoded using the information amount (equation (22)) of the cases (total number of grid points) already found, and Ubuf [index] (corresponding to the original signal) is output in step S214, and the process ends.

In the Examples above, the example of coding index using cases was described, but for coding the index, universal variable length code (UVLC: Universal Variable Length Code) or stop code may also be used. When universal variable length code or stop code is used for coding index, decoding is possible even if cases on the decoding side is not known. In this case, the coding amount for index may have to be increased by slightly less than 20%. However, since there is no need to calculate the value of cases, the process can be suspended halfway through the multiple loops. This has the advantage that the time for both coding and decoding can be reduced to about half. Another advantage is that the array storage Ubuf [ ] on the decoding side is not necessary.

Embodiments and Examples of the present invention have been described above referring to the drawings, but these are meant only for illustrating the present invention, which is evidently not limited to only these Embodiments and Examples. Consequently, various changes such as additions, omissions, substitutions, and so on of structural elements may be effected to the present invention without departing from the spirit and scope of the present invention.

For instance, in addition to the mode for realizing the apparatuses shown in FIGS. 3 to 5 by dedicated hardware, the apparatuses may include a computer system provided with memory, central processing unit (CPU) and so on, with a program for realizing processing of these apparatuses (for instance, each step given in FIGS. 6 to 7) loaded in memory and executed, so that the functions of the apparatuses are realized. Moreover, the program for realizing the functions mentioned above may be recorded in recording media that can be read by a computer, and the program recorded in the recording media may be read by the computer system and run by the computer.

The computer system mentioned here is assumed to include an OS and hardware such as peripheral equipment. The recording media that can be read by a computer refers to portable media such as flexible disks, magneto-optical disks, ROM, CD-ROM and so on, and recording equipment such as hard disks integrated within the computer system. The above-mentioned program may be meant for realizing a part of the functions mentioned above, or it may be a difference file (difference program) that can realize the functions by combining with the programs recorded already in the computer system.

Furthermore, progressive lossless video coding apparatus and progressive lossless video decoding apparatus may be configured as described below.

That is, the progressive lossless video coding apparatus may be provided with: a means for generating bit streams compliant with the H.264 standard; a means for inputting a prediction signal by space prediction in intra-frame coding or by time prediction in inter-frame coding in the coding of each block of an image signal; a means for inputting a residual signal obtained by subtracting the prediction signal from the original signal; a means for determining transform coefficients obtained by applying orthogonal transformation on the residual signal based on the H.264 standard scheme and quantization coefficients that have quantized the transform coefficients; a means for identifying the existential space of transform coefficients established from quantization coefficients, quantization parameters and quantization methods; a validity judging means for judging whether the grid points in the space are valid as the results of orthogonal transformation of the residual signal; an enumerating means for enumerating grid points for which the judgments mentioned above are valid from the grid points in the space; a means for sequentially assigning serial numbers starting from 0 to the enumerated grid points; a means for obtaining serial numbers of grid points that match the transform coefficients of the residual signals from the enumerated grid points; and a means for coding the obtained serial numbers.

When enumerating grid points in the progressive lossless video coding apparatus mentioned above, a means may be provided for omitting the validity judging process for points at which transform coefficients cannot take in the space, by using integer value relationship between transform coefficients.

The above-mentioned progressive lossless video coding apparatus may also include: a means for transmitting information excluding values for which some specific transform coefficients cannot take by using integer value relationship between the specific transform coefficients and already transmitted coefficients (if they exist), instead of transmitting the specific transform coefficients; and a means for enumerating grid points in existential space, the dimension of which is reduced, using transform coefficients transmitted beforehand.

The progressive lossless video coding apparatus mentioned above, may also include a means for equivalently realizing the validity judgment mentioned above only with bit operation, integer addition, and integer subtraction.

The progressive lossless video coding apparatus mentioned above may include a means for suspending the above-mentioned validity judgment halfway by using the knowledge that the intersection of existential range of residual signals and existential range of transform coefficients forms a convex polyhedron.

The progressive lossless video coding apparatus mentioned above may include a means for estimating the coding amount without enumerating the grid points by the above-mentioned enumerating means.

The progressive lossless video decoding apparatus corresponding to the progressive lossless video coding apparatus mentioned above, includes: a means for implementing the H.264 standard decoding scheme; a means for identifying the existential space of transform coefficients established from quantization parameters, quantization coefficients, quantization methods on the coding side and from already-reproduced coefficients (if they exist); a means for decoding coefficients to be decoded; an enumerating means and a validity judging means similar to the first through third aspects of the present invention; a means for decoding serial numbers; and a means for outputting grid points, the order of which is equal to a serial number.

INDUSTRIAL APPLICABILITY

The present invention is related to progressive lossless video coding and decoding technology that realizes highly efficient video coding and decoding. According to the present invention, while maintaining compatibility with the coding in the H.264 standard for codes transmitted as base part, lossless decoding matching the original signals can be performed while restricting the coding amount of the additional part to a minimum. Moreover, according to the present invention, processing can be speeded up by several trillions of times. Furthermore, according to the present invention, the coding amount can be estimated without actually performing the coding, and as a result, the prediction mode for reducing the coding amount can be selected at high speed.

The invention claimed is:

1. A progressive lossless video coding method that performs video coding which allows decoding that matches an original signal comprising:
    a step that inputs a residual signal obtained by subtracting a prediction signal from an original signal for each block of an image signal, the prediction signal conforming to a predetermined lossy video coding scheme and being obtained by space prediction in intra-frame coding or by time prediction in inter-frame coding;
    a step that determines transform coefficients obtained by applying orthogonal transformation on the residual signal and quantization coefficients obtained by quantizing the transform coefficients based on the lossy video coding scheme;
    a step that identifies existential space of transformed coefficients established from the quantization coefficients, and quantization parameters and quantization methods used during quantization;
    a validity judging step that judges whether grid points in the existential space of the transform coefficients are valid as a result of orthogonal transformation of the residual signal;
    an enumerating step that searches, in a predetermined grid point order, grid points for which the judgment is valid from the grid points in the existential space of the transform coefficients, and enumerates the grid points thus searched;
    a step that assigns serial numbers in the order of enumeration to enumerated grid points;
    a step that acquires serial numbers of grid points matching the transform coefficients of the residual signal from the enumerated grid points, and
    a step that codes and outputs the serial numbers of the grid points matching the transform coefficients of the residual signal.

2. The progressive lossless video coding method as set forth in claim 1, wherein, in the enumerating step that enumerates the grid points for which the judgment is valid from the grid points in the existential space of the transform coefficients, processing of judgment on whether the grid points are valid as the result of the orthogonal transformation of the residual signal is omitted for grid points at which transform coefficients cannot take in the space by using an integer value relationship between the transform coefficients.

3. The progressive lossless video coding method as set forth in claim 1, further comprising a step that outputs information excluding values for which some specific transform coefficients cannot take by using an integer value relationship between the specific transform coefficients and coefficients which have been already output, instead of outputting the specific transform coefficients,
    wherein, in the enumerating step that enumerates grid points for which the judgment is valid from the grid points in the existential space of the transform coefficients, the grid points are enumerated in existential space having a reduced dimension using the transform coefficients output beforehand.

4. The progressive lossless video coding method as set forth in claim 1, wherein the validity judging step judges validity using only bit operations, integer addition, and integer subtraction.

5. The progressive lossless video coding method as set forth in claim 1, wherein, by using the knowledge that an intersection between an existential range of the residual signal and an existential range of the transform coefficients becomes a convex polyhedron, the validity judgment is suspended halfway when the grid points to be judged exist outside the convex polyhedron.

6. The progressive lossless video coding method as set forth in claim 1, further comprising a step that estimates a coding amount without executing the enumerating step that enumerates the grid points for which the judgment is valid from the grid points in the existential space of the transform coefficients.

7. A decoding method for decoding coded streams coded by the progressive lossless video coding method as set forth in any of claim 1 to claim 6, comprising:
    a step that executes a decoding scheme corresponding to the predetermined lossy video coding scheme;
    a step that identifies existential space of transform coefficients established from quantization parameters, quantization coefficients, quantization methods on a coding side, and, if any, already decoded coefficients;
    a step that decodes coefficients that need to be decoded;
    a validity judging step that judges whether a grid point in the existential space of the transform coefficients is valid as a result of orthogonal transformation of the residual signal;
    an enumerating step that searches grid points from the grid points in the existential space of the transform coefficients for which the judgment is valid in the same order as the order of search of the grid points during coding;
    a step that decodes serial numbers; and
    a step that outputs grid points having orders that are equal to the decoded serial numbers from enumerated grid points.

8. A lossless video coding apparatus that performs video coding which allows decoding that matches an original signal, comprising:
- a means that inputs a residual signal obtained by subtracting a prediction signal from an original signal for each block of an image signal, the prediction signal conforming to a predetermined lossy video coding scheme and being obtained by space prediction in intra-frame coding or by time prediction in inter-frame coding;
- a means that determines transform coefficients obtained by applying orthogonal transformation on the residual signal and quantization coefficients obtained by quantizing the transform coefficients based on the lossy video coding scheme;
- an existential space deciding means that identifies existential space of transformed coefficients established from the quantization coefficients, and quantization parameters and quantization methods used during quantization;
- a validity judging means that judges whether grid points in the existential space of the transform coefficients are valid as a result of the orthogonal transformation of the residual signal;
- an enumerating means that searches, in a predetermined grid point order, grid points for which the judgment is valid from the grid points in the existential space of the transform coefficients, and enumerates the grid points thus searched;
- a means that assigns serial numbers in the order of enumeration to enumerated grid points;
- a means that acquires serial numbers of grid points matching the transform coefficients of the residual signal from enumerated grid points, and
- a means that codes and outputs the serial numbers of the grid points matching the transform coefficients of the residual signal.

9. A lossless video decoding apparatus that decodes coded streams coded by the progressive lossless video coding apparatus as set forth in claim 8, comprising:
- a means that executes a decoding scheme corresponding to the predetermined lossy video coding scheme;
- an existential space determining means that identifies existential space of transform coefficients established from quantization parameters, quantization coefficients, quantization methods on a coding side, and, if any, already decoded coefficients;
- a coefficient decoding means that decodes coefficients that need to be decoded;
- a validity judging means that judges whether a grid point in the existential space of the transform coefficients is valid as a result of orthogonal transformation of the residual signal;
- an enumerating means that searches grid points from the grid points in the existential space of the transform coefficients for which the judgment is valid in the same order as the order of search of grid points during coding;
- a serial number decoding means that decodes serial numbers; and
- an output means that outputs grid points having orders that are equal to the decoded serial numbers from enumerated grid points.

10. A non-transitory computer-readable recording medium for progressive lossless video coding program wherein a program for executing on a computer the progressive lossless video coding method as set forth in any of claim 1 to claim 6 is recorded on a recording medium that can be read by the computer.

11. A non-transitory computer-readable recording medium for progressive lossless video decoding program wherein a program for executing on a computer the progressive lossless video decoding method as set forth in claim 7 is recorded on a recording medium that can read by the computer.

* * * * *